US012172447B2

(12) United States Patent
Mizutani et al.

(10) Patent No.: US 12,172,447 B2
(45) Date of Patent: Dec. 24, 2024

(54) INK REPLENISHMENT CONTAINER

(71) Applicant: SEIKO EPSON CORPORATION, Tokyo (JP)

(72) Inventors: Tadahiro Mizutani, Shiojiri (JP); Yoshihiro Koizumi, Shiojiri (JP); Shun Oya, Kiso-machi (JP); Takumi Nagashima, Matsumoto (JP); Tadashi Watanabe, Matsumoto (JP); Manabu Yamaguchi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 29 days.

(21) Appl. No.: 17/956,401

(22) Filed: Sep. 29, 2022

(65) Prior Publication Data

US 2023/0109391 A1 Apr. 6, 2023

(30) Foreign Application Priority Data

May 20, 2022 (JP) ................................ 2022-082697

(51) Int. Cl.
*B41J 2/175* (2006.01)

(52) U.S. Cl.
CPC ....... *B41J 2/17536* (2013.01); *B41J 2/17596* (2013.01)

(58) Field of Classification Search
CPC .... B41J 2/175; B41J 2/17503; B41J 2/17506; B41J 2/17509; B41J 2/17513; B41J 2/17523; B41J 2/1754; B41J 2/17596; B41J 2002/17573
See application file for complete search history.

(56) References Cited

U.S. PATENT DOCUMENTS

| | | | |
|---|---|---|---|
| 6,164,768 | A | 12/2000 | Murphy et al. |
| 10,350,896 | B2 | 7/2019 | Ishizawa et al. |
| 10,974,512 | B2 | 4/2021 | Ishizawa et al. |
| 11,059,299 | B2 | 7/2021 | Ishizawa et al. |
| 11,111,061 | B2 | 9/2021 | Nagai et al. |

(Continued)

FOREIGN PATENT DOCUMENTS

| | | | |
|---|---|---|---|
| CN | 207955030 | U | 10/2018 |
| EP | 0998393 | B1 | 12/2002 |

(Continued)

OTHER PUBLICATIONS

U.S. Appl. No. 17/946,397, filed Sep. 16, 2022 in the name of Tadahiro Mizutani et al.
Feb. 27, 2024 Office Action Issued in U.S. Appl. No. 17/946,397.

*Primary Examiner* — Anh T Vo
(74) *Attorney, Agent, or Firm* — Oliff PLC

(57) ABSTRACT

There is provided an ink replenishment container for replenishing ink into an ink tank via an ink inlet flow path member, the ink replenishment container including a container main body, an ink outlet forming portion having a tubular portion, a spring valve having a valve body mounted in the tubular portion and a spring for urging the valve body toward the ink outlet, and a sealing member mounted in the tubular portion and having a sealing end configured to contact with the valve body in a valve close state, in which the sealing member has a cylindrical inner peripheral wall and an elastic membrane portion extending from the inner peripheral wall toward a center, and the elastic membrane portion is formed with a slit-shaped gap passing through a center portion including the center.

20 Claims, 21 Drawing Sheets

(56) References Cited

U.S. PATENT DOCUMENTS

| | | | |
|---|---|---|---|
| 2005/0088497 | A1 | 4/2005 | Katayama et al. |
| 2017/0355191 | A1 | 12/2017 | Mizutani et al. |
| 2018/0250943 | A1 | 9/2018 | Fukasawa et al. |
| 2018/0250944 | A1 | 9/2018 | Ishizawa et al. |
| 2020/0307872 | A1 | 10/2020 | Nagai et al. |
| 2021/0253312 | A1 | 8/2021 | Teshima |
| 2021/0261301 | A1 | 8/2021 | Masukawa et al. |

FOREIGN PATENT DOCUMENTS

| | | | |
|---|---|---|---|
| EP | 1403067 | A1 | 3/2004 |
| EP | 3381697 | A1 | 10/2018 |
| EP | 3470229 | A1 | 4/2019 |
| EP | 3470230 | A1 | 4/2019 |
| EP | 3939795 | A1 | 1/2022 |
| JP | H09-066959 | A | 3/1997 |
| JP | 2014-213565 | A | 11/2014 |
| JP | 2018-144230 | A | 9/2018 |
| JP | 2018-144281 | A | 9/2018 |
| JP | 2020-164231 | A | 10/2020 |
| JP | 2021-130254 | A | 9/2021 |
| JP | 2021-130488 | A | 9/2021 |

INK REPLENISHMENT CONTAINER

The present application is based on, and claims priority from JP Application Serial Number 2021-160826, filed Sep. 30, 2021 and JP Application Serial Number 2022-082697, filed May 20, 2022, the disclosures of which are hereby incorporated by reference herein in their entirety.

BACKGROUND

1. Technical Field

The present disclosure relates to an ink replenishment container.

2. Related Art

In the related art, as an example of an ink ejecting apparatus, an ink jet printer capable of performing a print with ink on a printing medium such as printing paper by ejecting the ink from a print head toward the printing medium is known. Such an ink jet printer is an ink replenishment type printer that is used by replenishing ink in an ink tank. JP-A-2018-144281 discloses an ink replenishment container used for replenishing ink to an ink tank having an ink replenishment type.

In the ink replenishment container in JP-A-2018-144281, there is room for improvement in reducing dripping of ink from an ink outlet when the ink replenishment container is removed from an ink inlet flow path member.

SUMMARY (1) According to a first aspect of the present disclosure, there is provided an ink replenishment container for replenishing ink into an ink tank of a printer via an ink inlet flow path member of the ink tank, the ink inlet flow path member having a plurality of flow paths partitioned by a partition. The ink replenishment container includes: a container main body configured to accommodate the ink; an ink outlet forming portion coupled to the container main body and including a tubular portion having an ink outlet; a spring valve that includes a valve body mounted in the tubular portion and a spring which urges the valve body toward the ink outlet in a direction of a central axis of the ink outlet, and has a valve open state in which the valve body is pressed by the ink inlet flow path member in a direction opposite to the urging direction and has a valve close state in which the ink inlet flow path member is removed from the ink outlet; and a sealing member mounted in the tubular portion and having a sealing end configured to contact with the valve body in the valve close state, in which the sealing member has a cylindrical inner peripheral wall centered on the central axis and an elastic membrane portion extending from the inner peripheral wall toward the center, and the elastic membrane portion is formed with a slit-shaped gap passing through a center portion including the center.

(2) According to a second aspect of the present disclosure, there is provided an ink replenishment container for replenishing ink into an ink tank of a printer via an ink inlet flow path member of the ink tank, the ink inlet flow path member having a plurality of flow paths partitioned by a partition. The ink replenishment container includes: a container main body configured to accommodate the ink; an ink outlet forming portion coupled to the container main body and including a tubular portion having an ink outlet; a spring valve that includes a valve body mounted in the tubular portion and a spring which urges the valve body toward the ink outlet in a direction of a central axis of the ink outlet, and has a valve open state in which the valve body is pressed by the ink inlet flow path member in a direction opposite to the urging direction and has a valve close state in which the ink inlet flow path member is removed from the ink outlet; and a sealing member mounted in the tubular portion and having a sealing end configured to contact with the valve body in the valve close state, in which the sealing member has a plurality of wing-like portions made of an elastic material and separated by a plurality of slit-shaped gaps extending from a center portion in a radial direction when viewed from an ink outlet side in the direction of the central axis.

(3) According to a third aspect of the present disclosure, there is provided an ink replenishment container for replenishing ink into an ink tank of a printer via an ink inlet flow path member of the ink tank, the ink inlet flow path member having a plurality of flow paths partitioned by a partition. The ink replenishment container includes: a container main body configured to accommodate the ink; an ink outlet forming portion coupled to the container main body and including a tubular portion having an ink outlet; a spring valve that includes a valve body mounted in the tubular portion and a spring which urges the valve body toward the ink outlet in a direction of a central axis of the ink outlet, and has a valve open state in which the valve body is pressed by the ink inlet flow path member in a direction opposite to the urging direction and has a valve close state in which the ink inlet flow path member is removed from the ink outlet; and a sealing member that is mounted in the tubular portion and that is configured to contact and seal the valve body in the valve close state, in which the sealing member has a projecting sealing portion configured to contact and seal an outer peripheral side surface of the ink inlet flow path member in the valve open state, and when the valve open state is shifted to the valve close state, the sealing between the projecting sealing portion and the ink inlet flow path member is released, and then the contact between the valve body and the ink inlet flow path member is released.

DESCRIPTION OF EXEMPLARY EMBODIMENTS

A. First Embodiment

Figure 1:
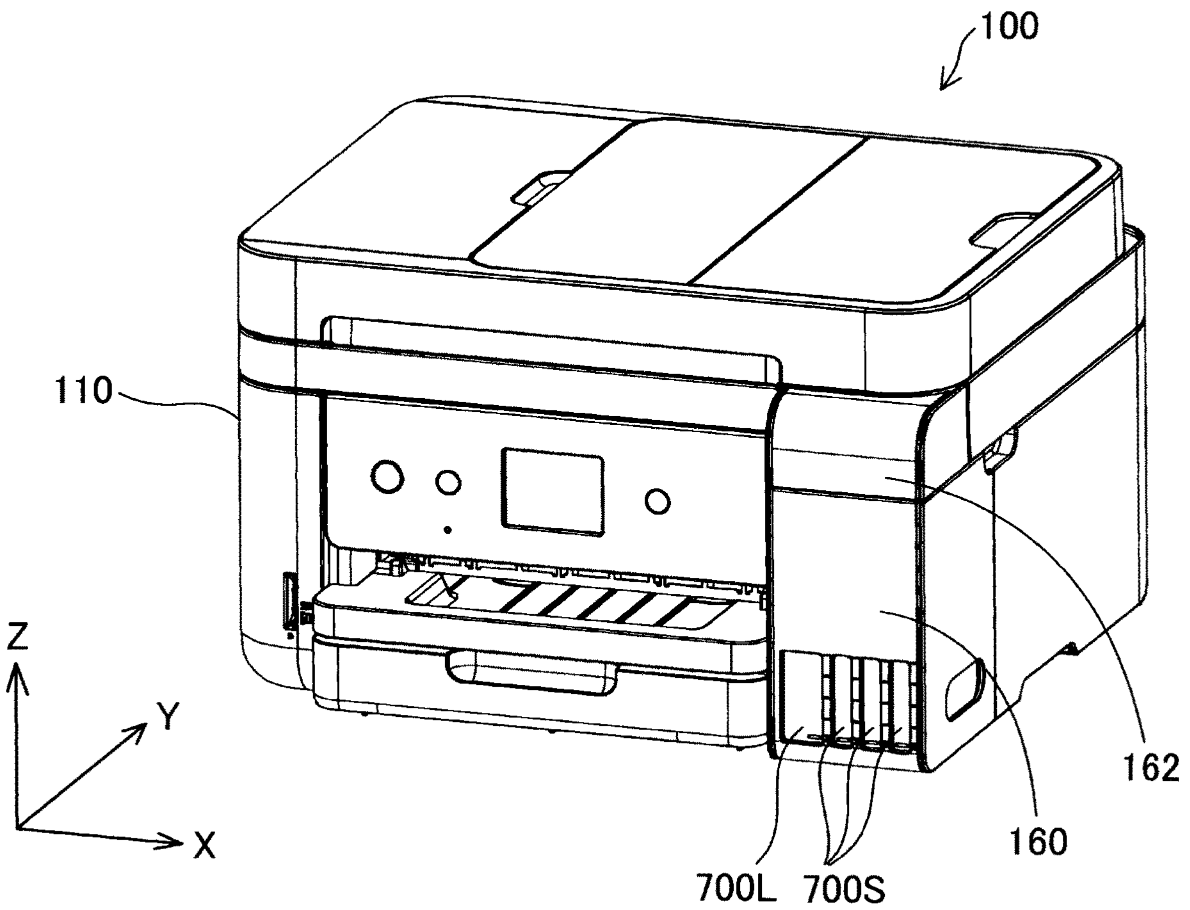
FIG. 1 is a perspective view of a printer according to a first embodiment.

FIG. 1 is a perspective view of a printer 100 according to a first embodiment. The printer 100 is an ink jet printer that ejects ink onto a printing medium for printing. In FIG. 1, XYZ axes orthogonal to each other are drawn. The X-axis corresponds to a width direction of the printer 100, the Y-axis corresponds to a depth direction of the printer 100, and the Z-axis corresponds to a height direction of the printer 100. The printer 100 is installed on a horizontal installation surface defined by the X-axis direction and the Y-axis direction. The “X-axis direction” means a concept in which a +X direction and a −X direction are combined. In the same manner, the “Y-axis direction” means a concept in which a +Y direction and a −Y direction are combined, and the “Z-axis direction” means a concept in which a +Z direction and a −Z direction are combined.

The printer 100 has a housing 110. Inside the housing 110, a carriage (not illustrated) that can move in a main scanning direction (X-axis direction) is provided. The carriage is provided with a print head that ejects ink onto a printing medium. An ink tank accommodating unit 160 accommodating a plurality of ink tanks 700S and 700L is provided at one end of a front surface of the housing 110. The ink tank accommodating unit 160 has a lid 162 that can be opened and closed at a top portion of the ink tank accommodating unit 160. The ink tank 700S is a small-capacity tank, and the ink tank 700L is a large-capacity tank. Meanwhile, in the following description, the ink tank 700S and the ink tank 700L are simply referred to as an “ink tank 700” without distinction. Each ink tank 700 is coupled to a print head of the carriage by a tube (not illustrated). That is, the ink tank 700 is a stationary ink tank that is not mounted on the carriage of the printer 100. Further, each ink tank 700 is an ink replenishment type ink tank to which ink is replenished from an ink replenishment container when the remaining amount of ink is low. In the present embodiment, the ink tank 700 is a stationary ink tank, and the ink tank 700 may be mounted on the carriage of the printer 100.

Figure 2:
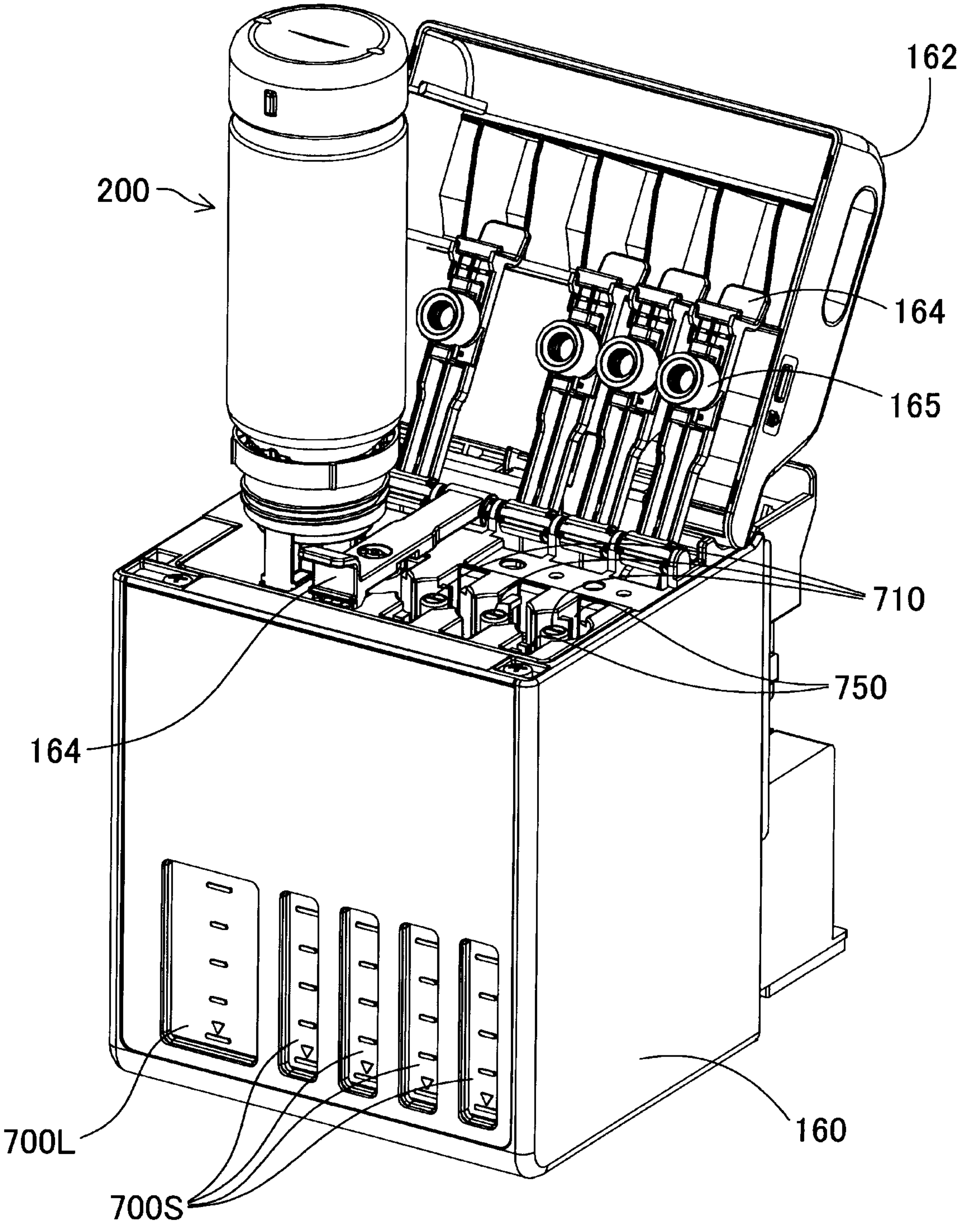
FIG. 2 is a perspective view illustrating a state in which ink is replenished to an ink tank by using an ink replenishment container.

FIG. 2 is a perspective view illustrating a state in which ink is replenished to the ink tank 700 by using an ink replenishment container 200. A front surface of each ink tank 700 is formed of a transparent member, and the remaining amount of ink in each ink tank 700 can be visually recognized from an outside. When the remaining amount of ink is low, as illustrated in FIG. 2, it is possible to open the lid 162 and replenish ink from an ink inlet flow path member 710 of the ink tank 700.

On an upper surface of each ink tank 700, the tubular ink inlet flow path member 710 for replenishing ink to the ink tank 700 is provided. The ink tank accommodating unit 160 includes a sealing cap member 164 having a sealing cap 165 for sealing a tip of the ink inlet flow path member 710. In a state in which ink is not replenished into the ink tank 700, the tip of the ink inlet flow path member 710 is sealed with the sealing cap 165 of the sealing cap member 164. When the ink is replenished into the ink tank 700, the sealing cap member 164 is separated from the ink inlet flow path member 710, and a tip portion of the ink replenishment container 200 is inserted at a position of the ink inlet flow path member 710 to replenish the ink. Two recess portions 750 that fit with a fitting portion (described below) of the ink replenishment container 200 are provided around the ink inlet flow path member 710. These recess portions 750 have a rotationally symmetric shape of 180 degrees based on the ink inlet flow path member 710.

In the present specification, the term “ink replenishment” means an operation of supplying ink to the ink tank 700 so as to increase the remaining amount of ink. Meanwhile, it is not necessary to fill-up the ink tank 700 with ink by “ink replenishment”. Further, “ink replenishment” includes an operation of filling the empty ink tank 700 with ink when the printer 100 is used for the first time.

Figure 3:
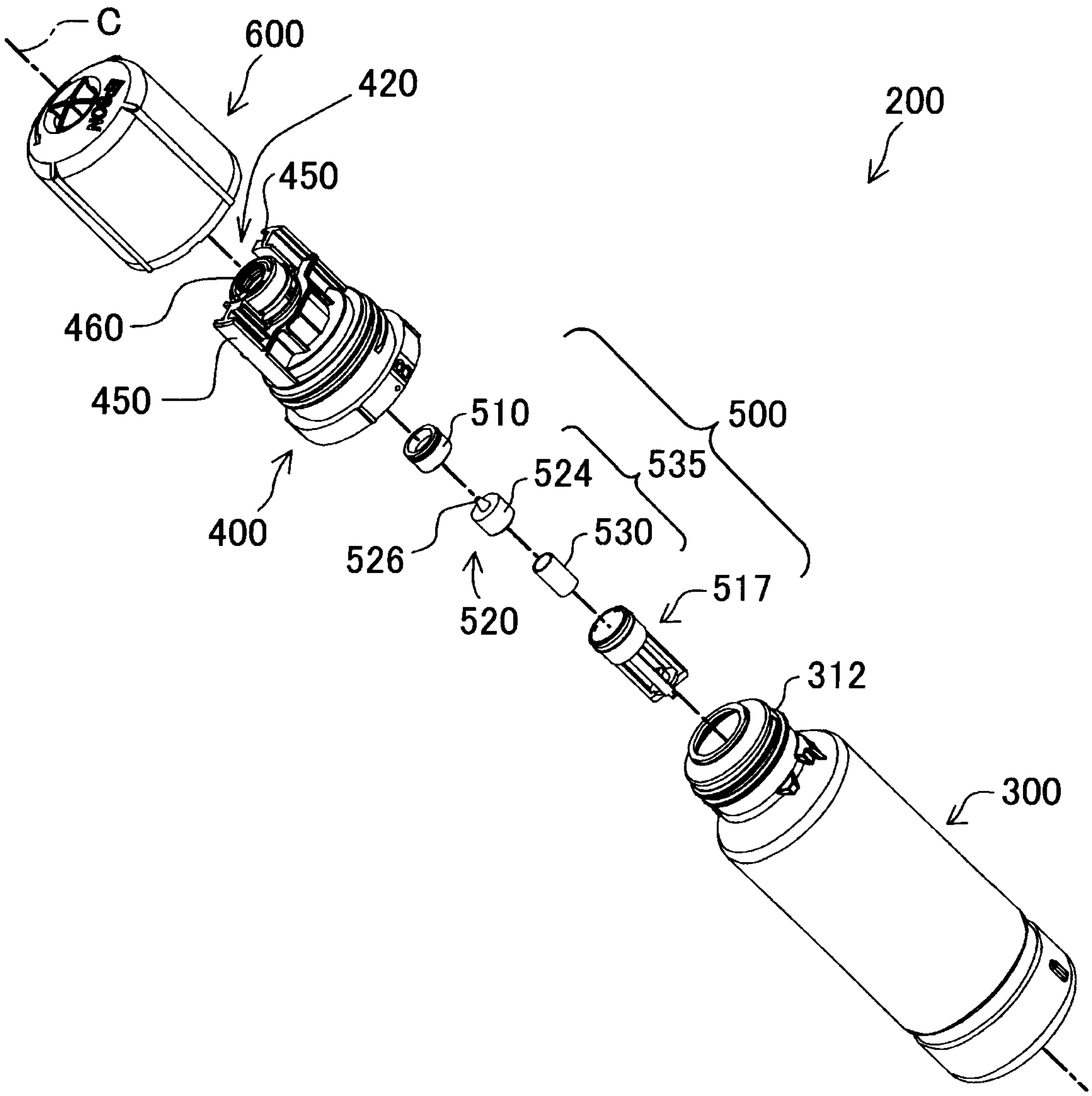
FIG. 3 is an exploded perspective view of the ink replenishment container according to the first embodiment.

FIG. 3 is an exploded perspective view of the ink replenishment container 200 according to the first embodiment. The ink replenishment container 200 has a container main body 300 capable of accommodating ink, an ink outlet forming portion 400 that forms an ink outlet 460, an outlet valve unit 500, and a cap 600 attached to the ink outlet forming portion 400. An upper end side of the ink replenishment container 200, which is a cap 600 side, is referred to as a “tip side”, and a lower end side of the ink replenishment container 200, which is a container main body 300 side, is referred to as a “rear end side”. The container main body 300 is a hollow cylindrical container having an opening on the tip side. An external screw 312 for mounting the ink outlet forming portion 400 is provided at a small-diameter portion at a tip of the container main body 300. In the present disclosure, a direction parallel to a central axis C of the ink replenishment container 200 is referred to as an “axial direction”, and a direction outward from the central axis C is referred to as a “diameter direction”.

The ink outlet 460 is provided at a tip of the ink outlet forming portion 400. The ink outlet forming portion 400 is coupled to the container main body 300, and includes a tubular portion 420 having the ink outlet 460. The outlet valve unit 500 is mounted in the tubular portion 420. Therefore, the outlet valve unit 500 can be regarded as a member constituting a part of the ink outlet forming portion 400. A valve housing 517 is mounted so as to provide a gap with the tubular portion 420 in a radial direction, in the tubular portion 420. At a time of ink replenishment to the ink tank 700, the ink inlet flow path member 710 (FIG. 2) of the ink tank 700 is inserted into the ink outlet 460.

The outlet valve unit 500 is configured to seal the ink outlet 460 so that ink does not leak to the outside in a non-replenishment state in which the ink is not replenished into the ink tank 700, and is configured to release the sealing so that the ink flows into the ink inlet flow path member 710 in a replenishment state in which the ink is replenished into the ink tank 700.

Figure 4:
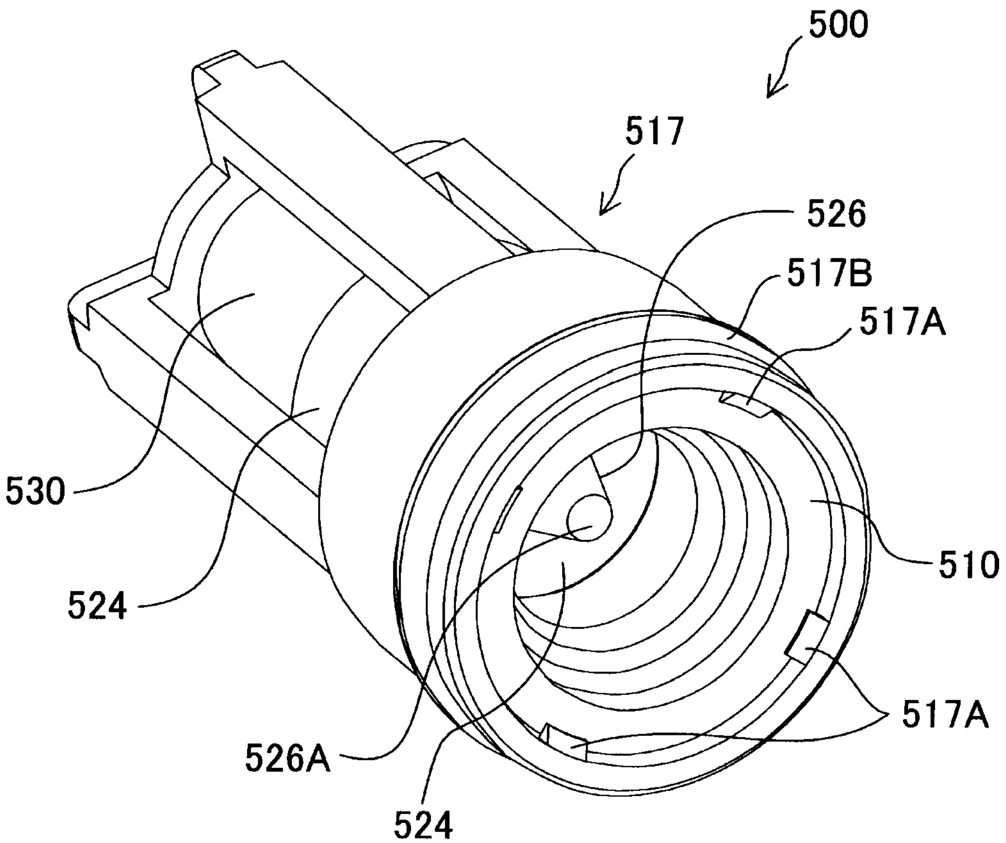
FIG. 4 is a perspective view of an outlet valve unit.
Figure 5:
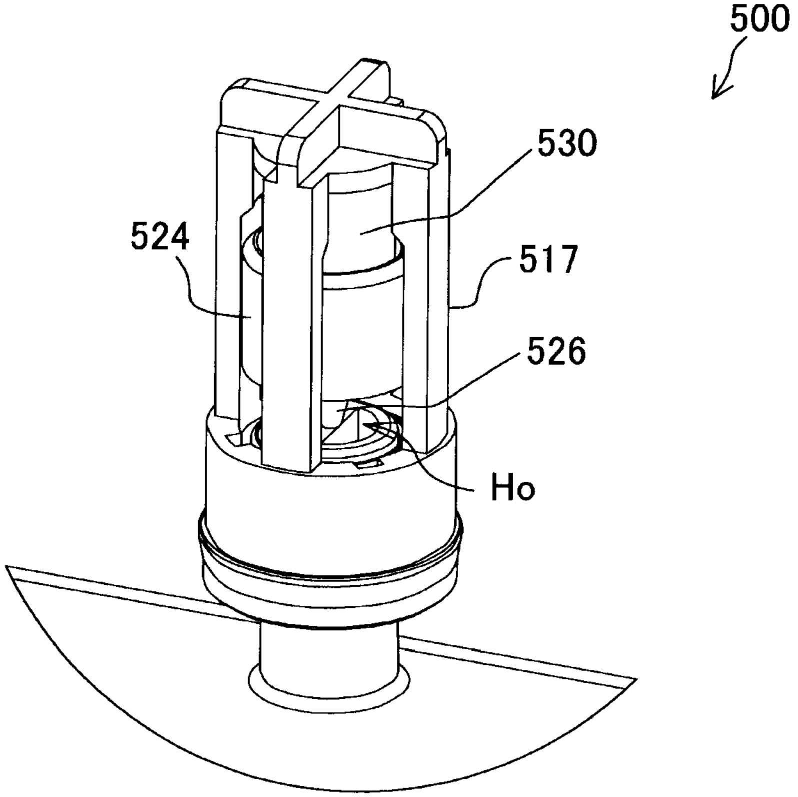
FIG. 5 is a perspective view illustrating a state in which an ink inlet flow path member is inserted into the outlet valve unit.

As illustrated in FIG. 3, the outlet valve unit 500 has the valve housing 517, a sealing member 510, and a spring valve 535. FIG. 4 is a perspective view of the outlet valve unit 500. FIG. 5 is a perspective view illustrating a state in which the ink inlet flow path member 710 is inserted into the outlet valve unit 500.

The ink inlet flow path member 710 can be inserted and removed through the valve housing 517. As illustrated in FIG. 4, the valve housing 517 has a retaining portion 517A of the sealing member 510 and an engaging portion 517B with the tubular portion 420, on the tip side. Therefore, since the outlet valve unit 500 is detachable by itself, it is easy to manufacture the outlet valve unit 500, the outlet valve unit 500 can be transported by itself, and the outlet valve unit 500 can be replaced when the ink replenishment container 200 is reused. As illustrated in FIG. 5, the valve housing 517 has a through-hole Ho penetrating in a direction intersecting the axial direction. The through-hole Ho is also a hole that penetrates a side wall of the valve housing 517 in the radial direction, centered on the central axis C, and is formed so as to extend in the axial direction as well. Further, the through-hole Ho communicates with the gap in the radial direction between the valve housing 517 and the tubular portion 420.

The spring valve 535 has a valve body 520 and a spring member 530. As illustrated in FIGS. 3 to 5, the spring member 530 is housed inside the valve housing 517. The spring member 530 is housed on a rear end side in the axial direction, in the valve housing 517. The spring member 530 can be made of metal, for example. In the present embodiment, the spring member 530 is a coil spring. The spring member 530 urges the valve body 520 toward the ink outlet 460 in the axial direction.

The valve body 520 is movably mounted inside the valve housing 517 in the axial direction. The valve body 520 has a cylindrical portion 524 and a projection portion 526. The valve body 520 has a configuration in which the projection portion 526 is disposed on an end surface of the cylindrical portion 524, which is a substantially cylindrical member. The cylindrical portion 524 faces an inner surface of the valve housing 517. The cylindrical portion 524 is configured to be slidable by being guided by the inner surface of the valve housing 517. Therefore, an opening and closing operation of the valve body 520 is appropriately performed. A valve open state and a valve close state of the valve body 520 will be described below. The valve body 520 can be formed of, for example, a thermoplastic resin such as polyethylene or polypropylene. As illustrated in FIG. 4, the projection portion 526 of the valve body 520 has a partition contact portion 526A having a circular end surface that can come into contact with a partition wall 714, which will be described below, of the ink inlet flow path member 710. The projection portion 526 is formed such that a cross-sectional area in an orthogonal direction orthogonal to the axial direction on the rear end side is larger than the cross-sectional area on the tip side having the partition contact portion 526A in the axial direction. The partition contact portion 526A has a circular end surface, and is not limited to the circular end surface, and may have an end surface having any shape such as an elliptical end surface as long as the operation and effect of the present disclosure are achieved.

The valve body 520 may be in the “valve close state” and the “valve open state”. Specifically, the valve body 520 is urged toward the sealing member 510 by the spring member 530. When the cylindrical portion 524 comes into contact with the sealing member 510 with such urging, the valve body 520 is in the “valve close state”. In this “valve close state”, the cylindrical portion 524 comes into contact with the sealing member 510, so that an opening in the axial direction is closed. Further, the valve body 520 is pressed by the ink inlet flow path member 710 in a direction opposite to an urging direction of the spring member 530. When the cylindrical portion 524 is separated from the sealing member 510 by such pressing, the valve body 520 is in the “valve open state”. In this “valve open state”, the cylindrical portion 524 is separated from the sealing member 510, so that the opening is formed in the axial direction.

Figure 6:
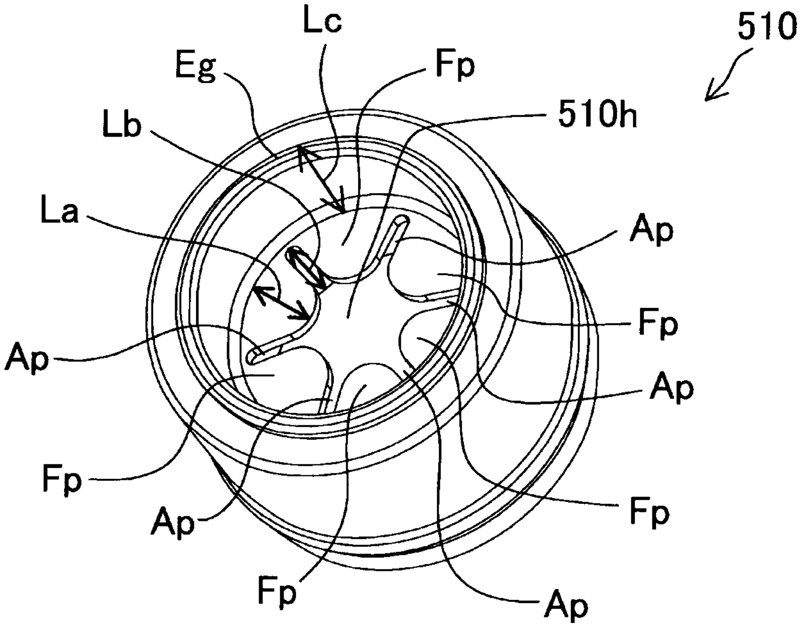
FIG. 6 is a perspective view of a sealing member.

FIG. 6 is a perspective view of the sealing member 510. The sealing member 510 has a substantially ring-shaped shape. The sealing member 510 can be formed of, for example, a rubber member (elastomer) having rubber elasticity. The sealing member 510 has an opening through which the ink inlet flow path member 710 can be inserted and removed. The sealing member 510 is mounted inside the tubular portion 420. As illustrated in FIG. 3, the sealing member 510 is located on the tip side than the spring member 530 in the axial direction.

As illustrated in FIG. 6, the sealing member 510 has a sealing end Eg configured to contact with the valve body 520 in the “valve close state”. The sealing member 510 has a sealing member through-hole 510*h* at a center portion of the sealing member 510. The sealing member 510 has six wing-like portions Fp separated by six slit-shaped gaps Ap extending in a radiation direction from the center portion when viewed from the tip side which is an ink outlet side in the axial direction. Therefore, the wing-like portion Fp that tries to be restored from elastic deformation blocks ink from being lifted from the ink inlet flow path member 710 when the ink replenishment container 200 is removed from the ink inlet flow path member 710, so that ink dripping can be reduced. Further, with a capillary action of the slit-shaped gap Ap, it becomes easier to hold the ink and it becomes possible to prevent the ink from dripping.

A length La from a base to a center portion side tip of the wing-like portion Fp in the radial direction is shorter than a length Lc from the base of the wing-like portion Fp of the sealing member 510 to the sealing end Eg in a central axis direction. Therefore, in the “valve open state” in which the ink inlet flow path member 710 presses the valve body 520 to open, it is easy to prevent an elastically deformed tip of the wing-like portion Fp from obstructing a flow of the ink and gas of a flow path of the ink inlet flow path member 710 and an inside of the container main body 300.

A length Lb from a center portion to an end of the gap Ap in the radial direction is shorter than a radius from an axis center of a central axis to an outer circumference of the ink inlet flow path member 710. Specifically, since the length Lb is short, the ink inlet flow path member 710 is inserted in a tightened state. Therefore, a sealing property between the ink inlet flow path member 710 and the base of the wing-like portion Fp is improved, and the ink is less likely to leak.

The components of the ink replenishment container 200 other than the outlet valve unit 500 can be formed of, for example, a thermoplastic resin such as polyethylene or polypropylene.

As illustrated in FIG. 3, two fitting portions 450 are provided around the ink outlet 460. These fitting portions 450 are positioning members that position the ink replenishment container 200 by being fit into the recess portions 750 (FIG. 2) provided around the ink inlet flow path member 710 of the ink tank 700. The positioning is, for example, at least one of a function that the ink replenishment container 200 for replenishing yellow ink is fitted into the recess portion 750 corresponding to the ink tank 700 accommodating yellow ink and the ink replenishment container 200 for replenishing ink of other colors such as magenta ink and cyan ink is not fitted into the recess portion 750 to prevent ink from being erroneously filled and a function of stabilizing an ink filling posture of the ink replenishment container as described below. The function of preventing ink from being erroneously filled is not limited to the color of the ink, and is, for example, a function to prevent dye ink and pigment ink from being erroneously filled, for black ink. In the first embodiment, the two fitting portions 450 have a rotationally symmetric shape of 180 degrees based on a central axis C of the ink replenishment container 200. In the same manner, the recess portion 750 provided around the ink inlet flow path member 710 of the ink tank 700 has a rotationally symmetric shape of 180 degrees based on the ink inlet flow path member 710. At the time of ink replenishment, the fitting portion 450 of the ink replenishment container 200 is fitted into the recess portion 750 around the ink inlet flow path member 710 of the ink tank 700, so that an orientation of the ink replenishment container 200 is limited to two orientations, which are rotationally symmetric by 180 degrees. As a result, it is possible to maintain the ink replenishment container 200 in a stable posture during ink replenishment. Meanwhile, the fitting portion 450 can be omitted.

Figure 7:
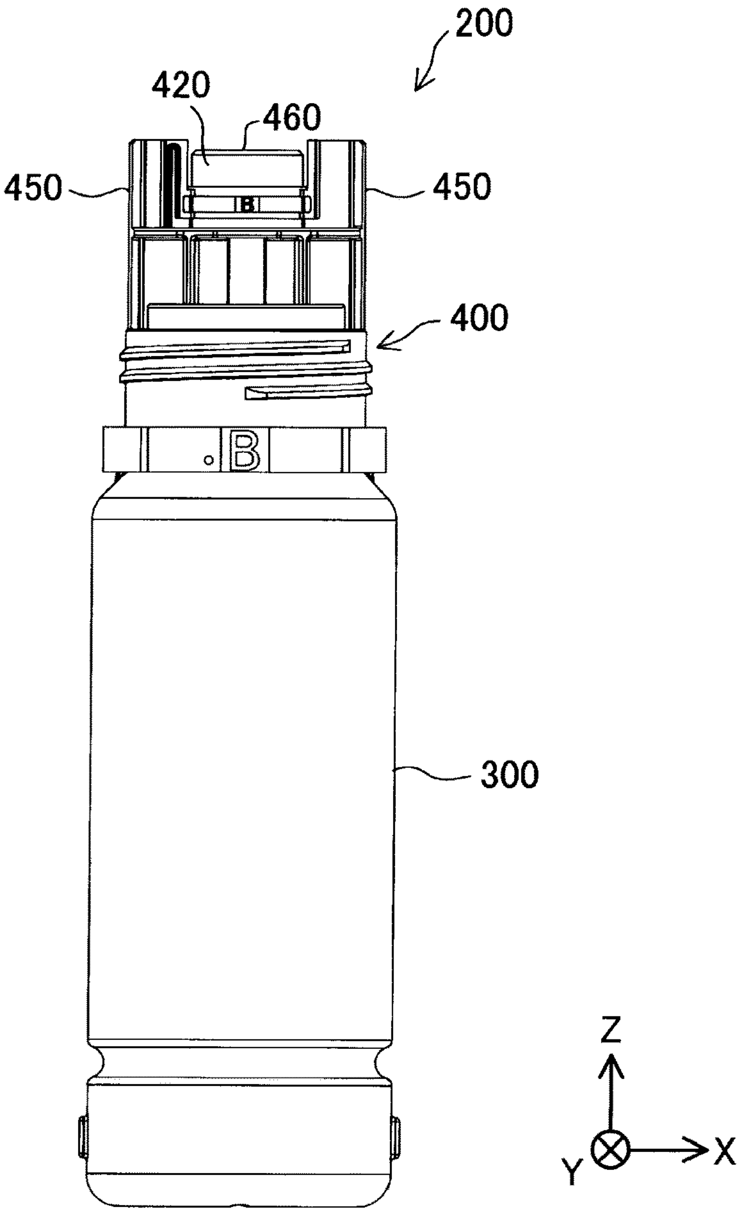
FIG. 7 is a front view of the ink replenishment container in a normal placement state.
Figure 8:
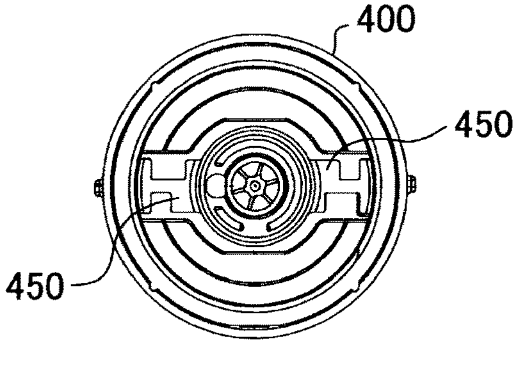
FIG. 8 is a plan view of FIG. 7.

FIG. 7 is a front view of the ink replenishment container 200 in a normal placement state, and FIG. 8 is a plan view of the ink replenishment container 200 in the normal placement state. The "normal placement state of the ink replenishment container 200" means a state in which a bottom of the container main body 300 is placed to face down on a horizontal surface such as a desk. As illustrated in FIG. 2 described above, ink is replenished to the ink tank 700 in an inverted posture with the tip side of the ink replenishment container 200 facing downward. FIGS. 7 and 8 illustrate a state in which the cap 600 is separated.

Figure 9:
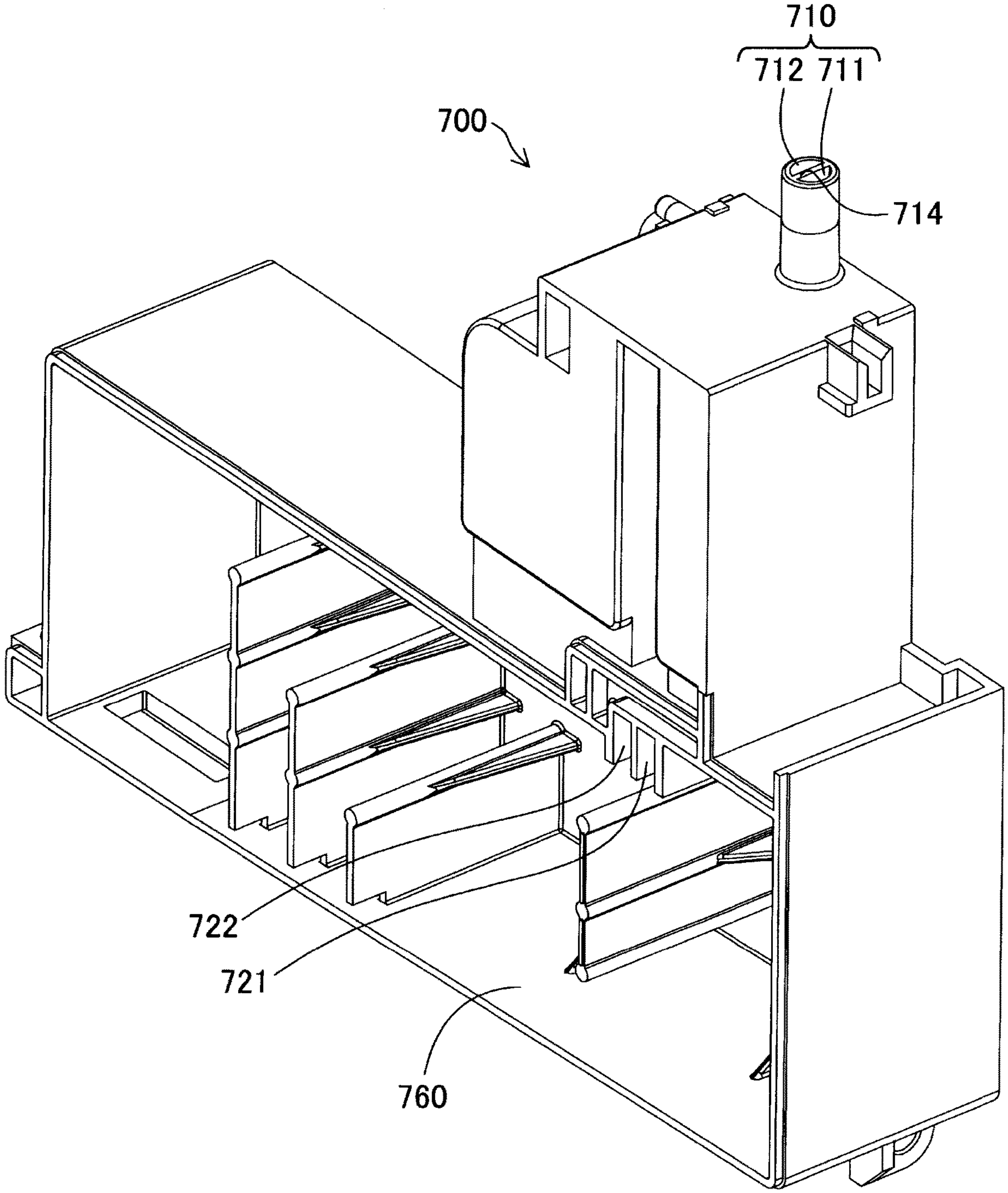
FIG. 9 is a perspective view of the ink tank according to the first embodiment.

FIG. 9 is a perspective view of the ink tank 700 according to the first embodiment. The ink inlet flow path member 710 of the ink tank 700 projects upward from the ink tank 700. The ink inlet flow path member 710 has two flow paths 711 and 712. The two flow paths 711 and 712 are divided by the partition wall 714. In the first embodiment, a tip surface of the ink inlet flow path member 710 is flat, and the two flow paths 711 and 712 are opened at the tip surface of the ink inlet flow path member 710, respectively. Further, a part of the tip surface of the ink inlet flow path member 710 corresponds to an end portion of the partition wall 714. At a time of ink replenishment, the fitting portion 450 of the ink replenishment container 200 is fitted into the recess portion 750 around the ink inlet flow path member 710 of the ink tank 700, and the ink replenishment container 200 is positioned in a circumferential direction. Therefore, the two flow paths 711 and 712 communicate with two in-tank flow paths 721 and 722 projecting into a lower ink storage chamber 760, respectively. Lower ends of these in-tank flow paths 721 and 722 extend below a ceiling wall of the ink storage chamber 760. The reason is that when ink is replenished from the ink replenishment container 200 to the ink tank 700, the air-liquid exchange is stopped when a liquid level in the ink storage chamber 760 reaches the lower ends of the in-tank flow paths 721 and 722, and the ink replenishment is accordingly stopped, so that the replenishment work of the ink is easy.

Figure 10:
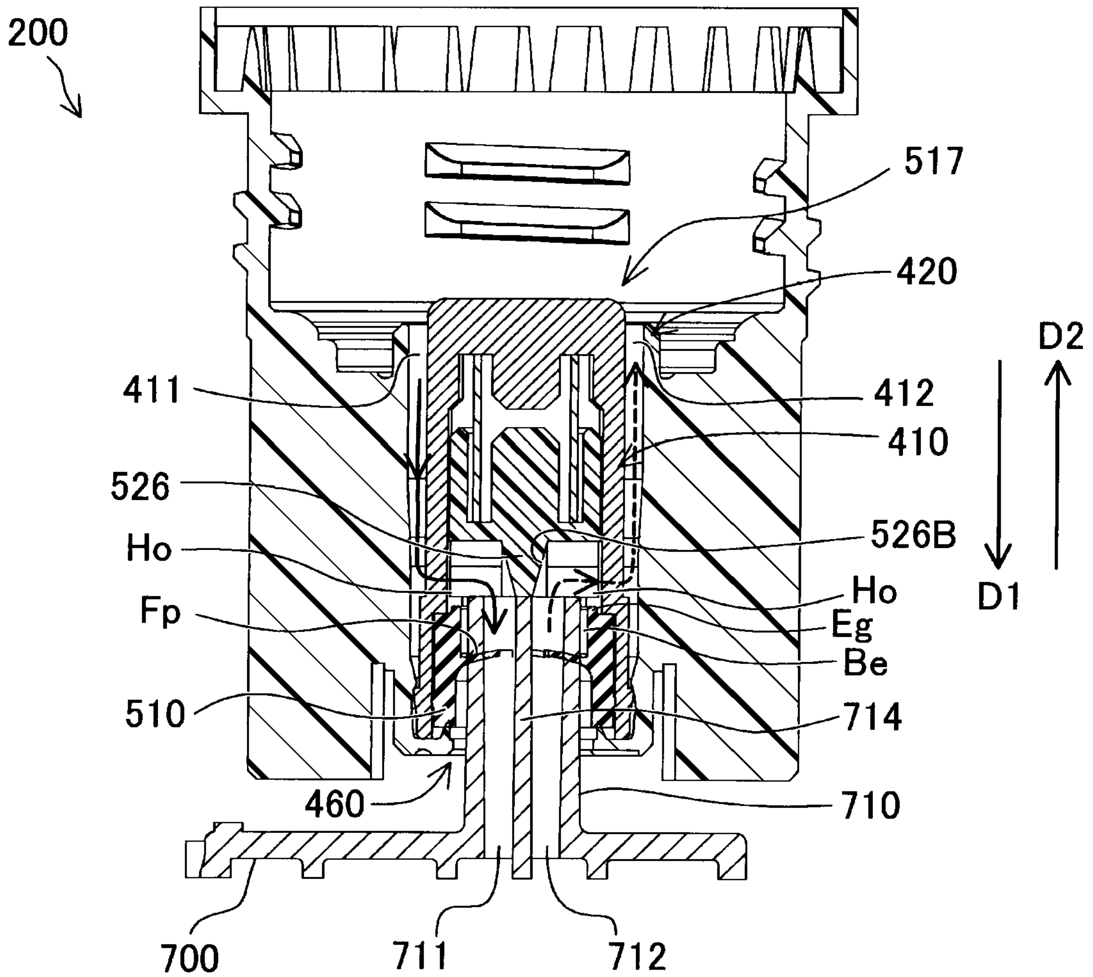
FIG. 10 is a cross-sectional view illustrating a replenishment state in which ink is replenished from the ink replenishment container to the ink tank.

FIG. 10 is a cross-sectional view illustrating a replenishment state in which ink is replenished from the ink replenishment container 200 to the ink tank 700. In this replenishment state, the ink replenishment container 200 has an inverted posture, a direction from a rear end to a tip of the ink replenishment container 200 is indicated as a tip side direction D1, and is a direction in which the ink replenishment container 200 is coupled to the ink inlet flow path member 710. The direction from the tip to the rear end of the ink replenishment container 200 is indicated as a rear end side direction D2, and is a direction in which the ink replenishment container 200 is removed from the ink inlet flow path member 710. In FIG. 10, only a part of each of the ink replenishment container 200 and the ink tank 700 is illustrated.

In the replenishment state as illustrated in FIG. 10, the tubular portion 420 is formed such that a gap Be into which the wing-like portion Fp enters is provided between an inner surface of the tubular portion 420 and an outer surface of the ink inlet flow path member 710. Therefore, a frictional resistance of inserting and removing the ink inlet flow path member 710 is reduced, and the ink replenishment container 200 can be easily coupled to and uncoupled from the ink inlet flow path member 710. When the wing-like portion Fp is expanded by inserting the ink inlet flow path member 710, the wing-like portion Fp enters into the gap Be. Meanwhile, in FIG. 10, for convenience of illustration, the wing-like portion Fp is illustrated in a state in which the wing-like portion Fp does not enter into the gap Be.

The ink inlet flow path member 710 of the ink tank 700 is inserted into the tubular flow path portion 410 via the opening of the sealing member 510. The tubular flow path portion 410 is configured as a flow path space inside the tubular portion 420. A flow path (also referred to as "replenishment flow path") on the inner peripheral surface side of the tubular portion 420 than a center of the tubular flow path portion 410 in the radial direction is divided into two replenishment flow paths 411 and 412 formed in a gap between the valve housing 517 and an inner peripheral surface of the tubular portion 420 when the projection portion 526 of the valve body 520 comes into contact with the partition wall 714 of the ink inlet flow path member 710. The gap forming the replenishment flow paths 411 and 412 also may include a gap via the through-hole Ho between the valve body 520 and the spring member 530 accommodated in the valve housing 517 and the inner peripheral surface of the tubular portion 420. Therefore, the gap can be said to be a gap via the through-hole Ho between the outlet valve unit 500 and the inner peripheral surface of the tubular portion 420. Further, as will be described below, in the ink replenishment state, one of the two replenishment flow paths 411 and 412 is used as a flow path of ink, and the other is used as a flow path of air. As a result, the ink replenishment container 200 can replenish the ink while the air-liquid exchange is performed with the ink tank 700. When the ink replenishment is performed by using the air-liquid exchange, it is not necessary to squeeze the container main body 300. As described above, a type of ink replenishment container capable of ink replenishment without squeezing the container main body 300 is also referred to as a "non-squeeze type". The flow path of the tubular flow path portion 410 does not need to be divided into the two replenishment flow paths 411 and 412 via the flow paths 711 and 712 of the ink inlet flow path member 710 and the through-holes Ho of the valve housing 517, and may be formed as one replenishment flow path. In that case, the ink inlet flow path member 710 may be illustrated in FIGS. 19 and 20, which will be described below. Further, the tubular flow path portion 410 may be divided into three or more replenishment flow paths, by the projection portion 526 of the valve body 520 coming into contact with the partition wall 714 obtained by partitioning the ink inlet flow path member 710 into three or more flow paths.

The outlet valve unit 500 is configured such that in the replenishment state, the replenishment flow paths 411 and 412 on the inner peripheral surface side of the tubular portion 420 than the center of the tubular flow path portion 410 in the radial direction communicate with the two flow paths 711 and 712 of the ink inlet flow path member 710. In order for the air and liquid to flow in and out through communication with the replenishment flow paths 411 and 412 and the two flow paths 711 and 712 of the ink inlet flow path member 710, it is necessary to be in the "valve open state" so that the air and liquid can be passed through the through-hole Ho.

The projection portion 526 of the valve body 520 is provided at a position facing the partition wall 714 of the ink inlet flow path member 710. In the replenishment state, the projection portion 526 of the valve body 520 is pushed by the ink inlet flow path member 710 and retracts toward the container main body 300 side, and the two flow paths 711 and 712 of the ink inlet flow path member 710 respectively communicate with the replenishment flow paths 411 and 412 on the inner peripheral surface side of the tubular portion 420 than the center of the tubular flow path portion 410 in the radial direction through the through-hole Ho. Such a state is the "valve open state" described above. As a result, it is allowed that ink in the container main body 300 flows into the ink inlet flow path member 710 via the replenishment flow paths 411 and 412. In FIG. 10, solid arrows indicate a flow of the ink, and dashed arrows indicate a flow of the air. As described above, in the replenishment state, the two flow paths 711 and 712 of the ink inlet flow path member 710 and the two replenishment flow paths 411 and 412 of the tubular flow path portion 410 are used to efficiently replenish ink from the ink replenishment container 200 to the ink tank 700 while performing the air-liquid exchange. In order to smoothly perform this air-liquid exchange, it is preferable that the replenishment flow path of the tubular flow path portion 410 is divided into a plurality of replenishment flow paths. The same applies to an ink inlet flow path of the ink inlet flow path member 710. In this case, in the replenishment state, it is preferable that one or more of a plurality of replenishment flow paths communicate with one or more of a plurality of ink inlet flow paths, and the other one or more of the plurality of replenishment flow paths communicate with the other one or more of the plurality of ink inlet flow paths.

As described above, the projection portion 526 is formed such that a cross-sectional area in an orthogonal direction orthogonal to the axial direction on the rear end side is larger than the cross-sectional area on the tip side having the partition contact portion 526A in the axial direction. Therefore, since the cross-sectional area on a side in contact with the partition wall 714 is smaller than the cross-sectional area on a rear end side, it is difficult to obstruct the inflow of the ink and the outflow of the air through a plurality of flow paths, and it is possible to smoothly perform the air-liquid exchange. Further, since the rear end side becomes thicker, a strength when the projection portion 526 of the valve body 520 comes into contact with the partition wall 714 can be maintained, and the partition function can be appropriately maintained.

As illustrated in FIGS. 4 and 10, the projection portion 526 of the valve body 520 has an inclined surface 526B enlarged from the tip side to the rear end side. Therefore, since the gas and the liquid flow along the inclined surface 526B, mutual interference is reduced, so the liquid can be quickly replenished by smoothly performing the air-liquid exchange.

As illustrated in FIG. 10, at least a center portion of the valve housing 517 on the rear end side is closed. Therefore, it is possible to prevent interference between the air and the liquid, smoothly perform the air-liquid exchange, and quickly replenish the ink.

Figure 11:
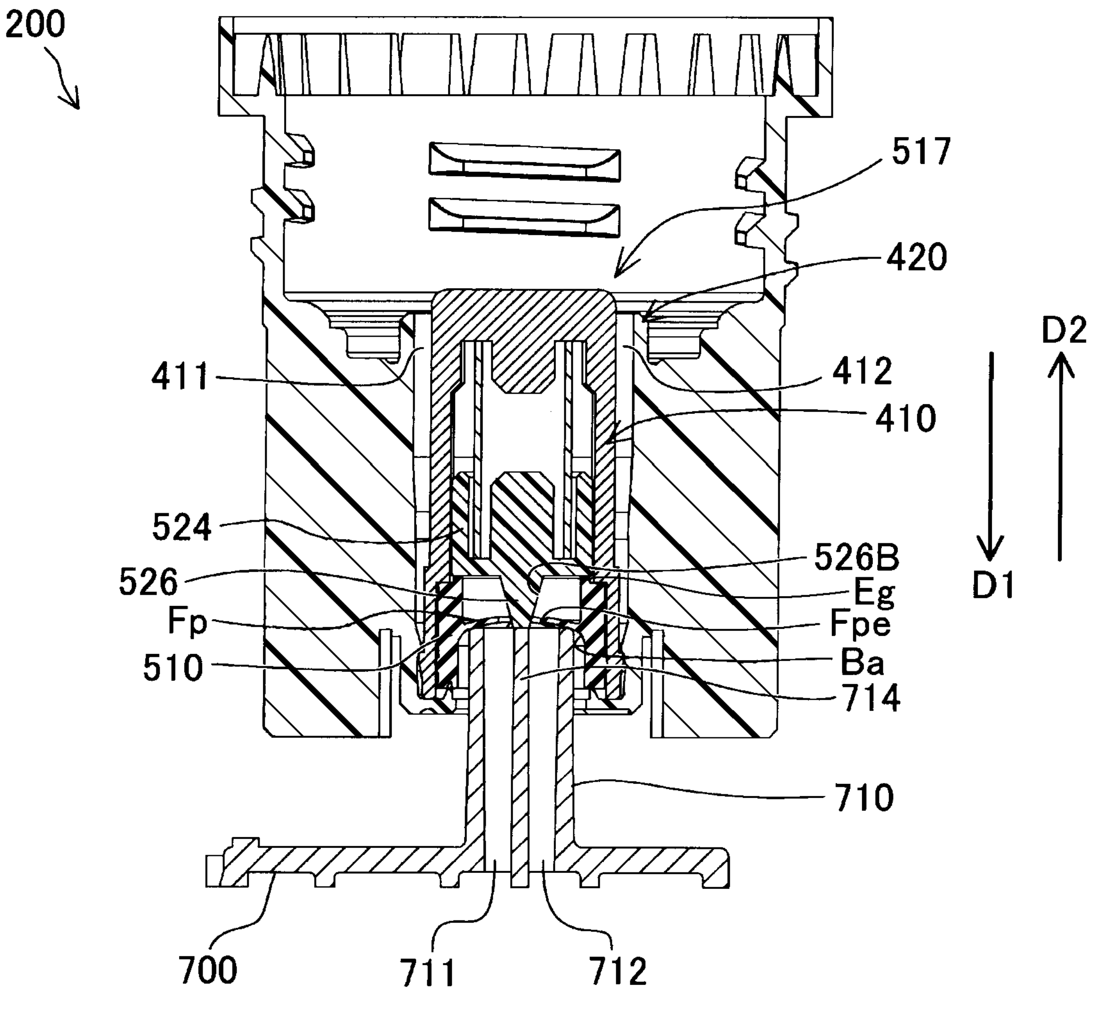
FIG. 11 is a first cross-sectional view when the ink replenishment container is removed from the ink inlet flow path member.
Figure 12:
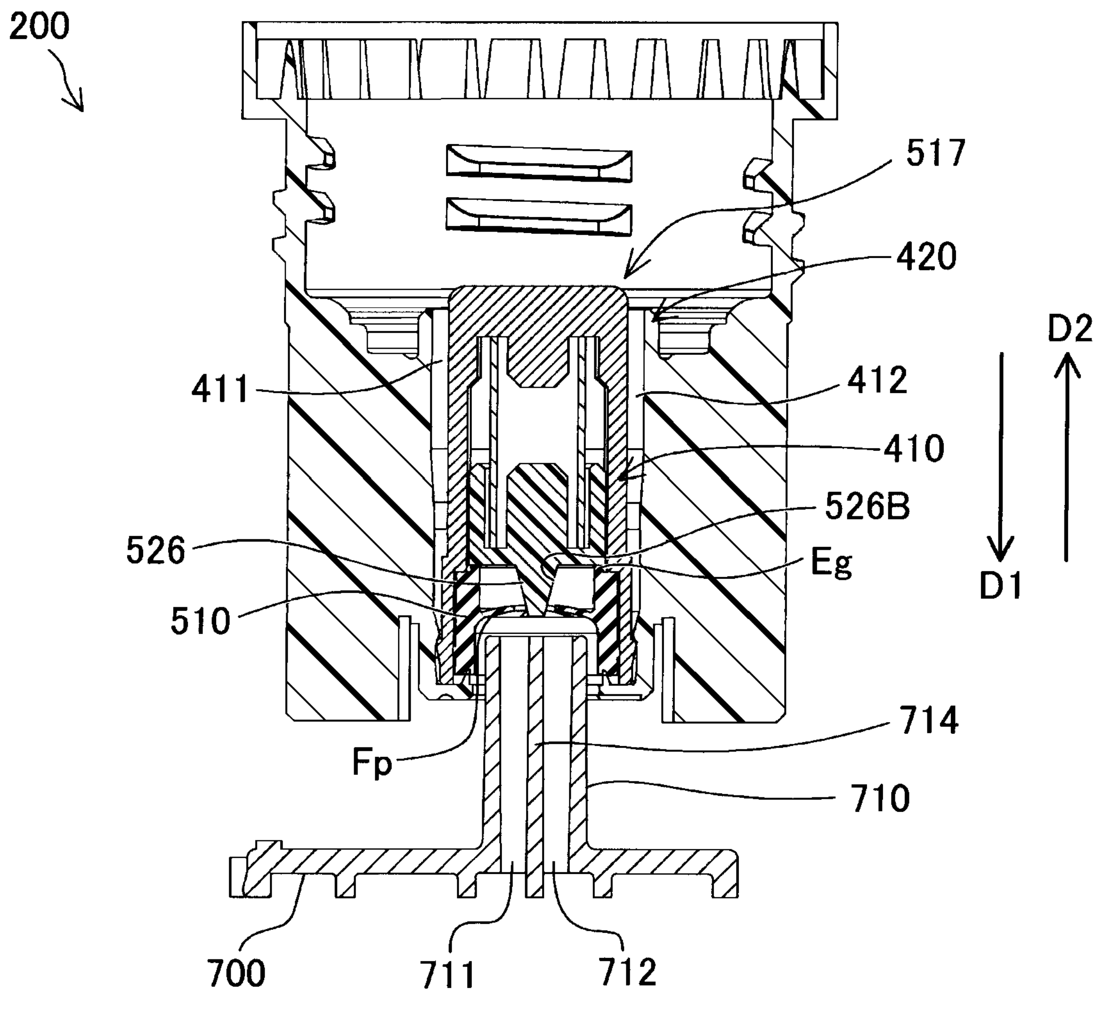
FIG. 12 is a second cross-sectional view when the ink replenishment container is removed from the ink inlet flow path member.

FIG. 11 is a first cross-sectional view when the ink replenishment container 200 is removed from the ink inlet flow path member 710. FIG. 12 is a second cross-sectional view when the ink replenishment container 200 is removed from the ink inlet flow path member 710. As illustrated in FIG. 11, the wing-like portion Fp is formed such that a center portion side tip Fpe is located on a rear end side direction D2 side in the axial direction from a base Ba and a cross-sectional shape is an arcuate shape. With this aspect, even when the ink inlet flow path member 710 is inserted to the rear end side and the wing-like portion Fp is pressed, as compared with a wing-like portion having a shape that is not inclined with respect to a direction perpendicular to the axial direction, the wing-like portion Fp is less likely to be deformed, so that a restoring force is less likely to decrease, and an ink holding force can be appropriately kept.

As illustrated in FIG. 11, the sealing end Eg and the cylindrical portion 524 are in contact with each other in the axial direction. FIG. 12 illustrates a state in which the ink replenishment container 200 is further pulled out from the state in FIG. 11 to the rear end side, and the valve body 520, the wing-like portion Fp, and the ink inlet flow path member 710 are separated from each other in the axial direction. At the time of ink replenishment as illustrated in FIG. 10, the ink adheres to an outer peripheral side surface of the ink inlet flow path member 710. When this state is shifted to the removed state as illustrated in FIG. 11, linking of the ink between the ink outlet 460 and a top portion of the ink inlet flow path member 710 is blocked by the wing-like portion Fp during being restored from elastic deformation. Such ink is transmitted on the wing-like portion Fp from a center side toward the outside in the radial direction, and is received and held at the base of the wing-like portion Fp. Therefore, when the ink replenishment container 200 is further pulled out from the state of FIG. 12 in the rear end side direction D2 and the ink replenishment container 200 and the ink tank 700 are completely separated from each other, such ink is unlikely to leak to the outside of the ink replenishment container 200 and the ink tank 700.

Figure 13:
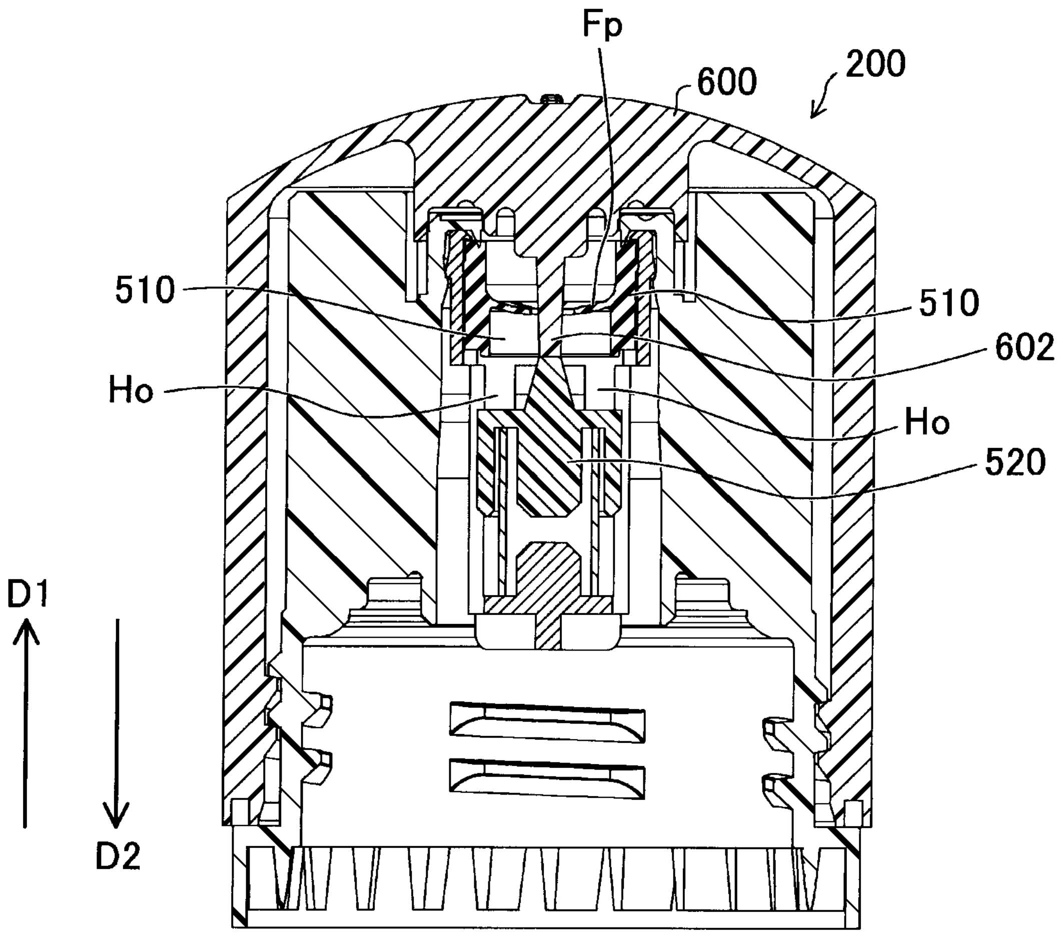
FIG. 13 is a cross-sectional view of the ink replenishment container when a cap is closed.
Figure 14:
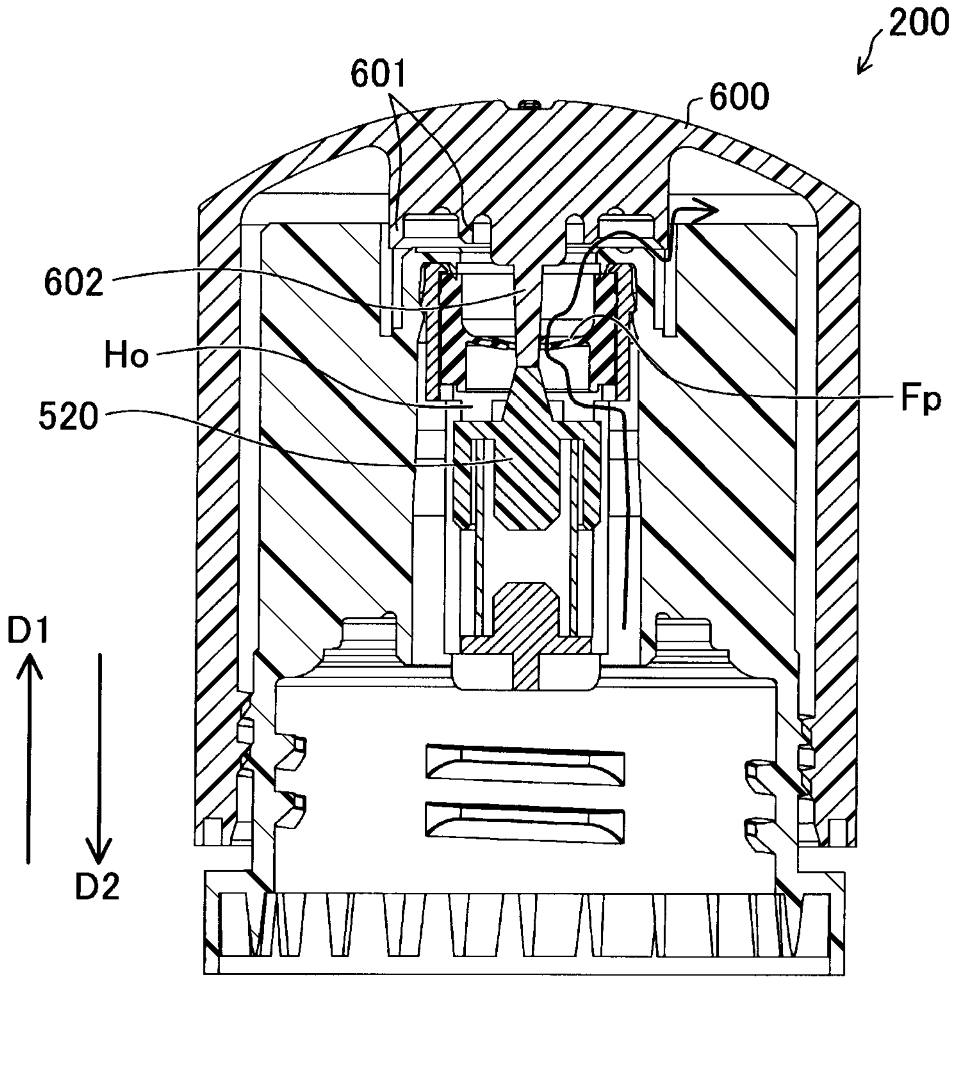
FIG. 14 is a cross-sectional view of the ink replenishment container in the middle of opening the cap.
Figure 15:
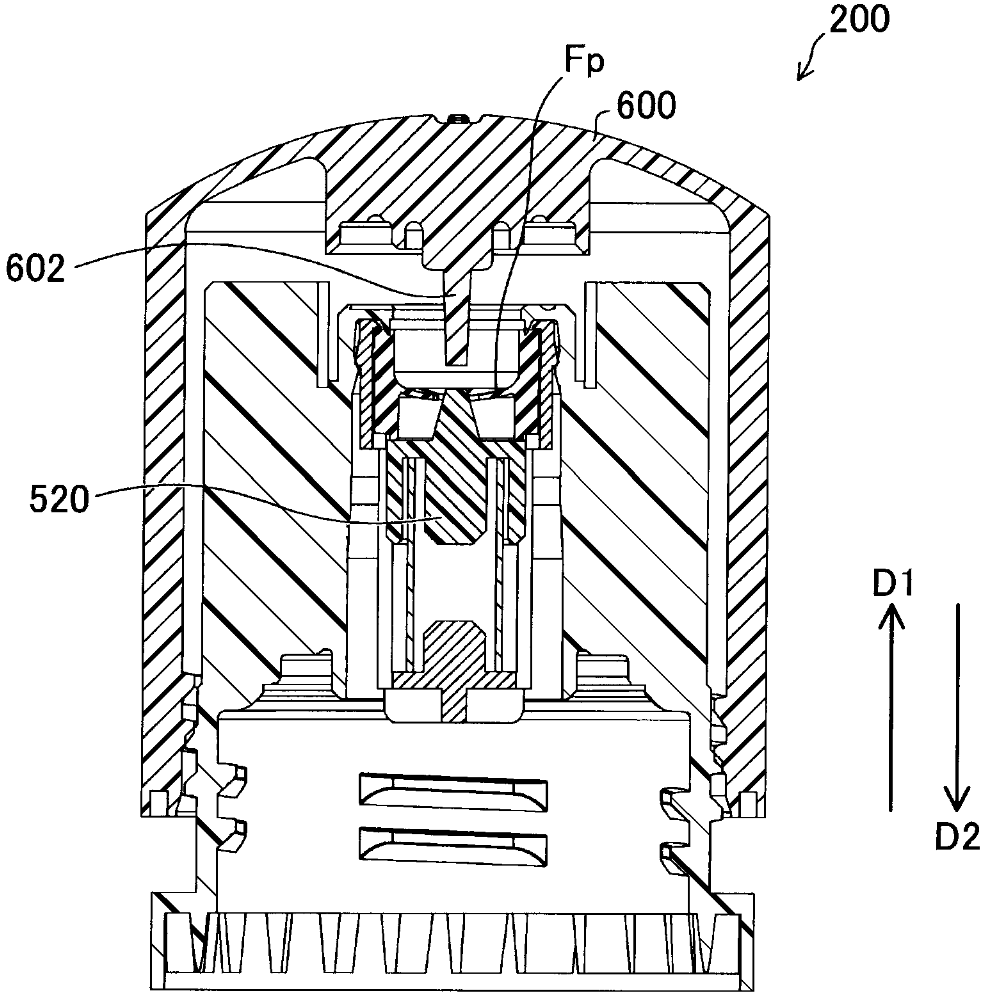
FIG. 15 is a cross-sectional view of the ink replenishment container when the cap is fully opened.

FIG. 13 is a cross-sectional view of the ink replenishment container 200 when the cap 600 is closed. FIG. 14 is a cross-sectional view of the ink replenishment container 200 in the middle of opening the cap 600. FIG. 15 is a cross-sectional view of the ink replenishment container 200 when the cap 600 is fully opened. In the state in which the cap is fully opened illustrated in FIG. 15, the valve body 520 and the sealing member 510 are in contact with each other in the valve close state. An arrow in the ink replenishment container 200 illustrated in FIG. 14 indicates a flow when the atmosphere is open. As illustrated in FIGS. 13 to 15, the cap 600 has a projection 602. As illustrated in FIGS. 13 and 14, the projection 602 is inserted into the sealing member through-hole 510*h* in a center portion without contacting a plurality of wing-like portions Fp. As illustrated in FIG. 13, in the state in which the cap 600 is closed, the projection 602 presses the valve body 520 in the rear end side direction D2 of the axial direction via the sealing member through-hole 510*h*, so the valve open state is obtained. As illustrated in FIG. 14, the valve body 520 moves in the tip side direction D1 in the axial direction, and an axial length of the through-hole Ho becomes shorter. Further, in the middle of opening the cap 600 illustrated in FIG. 14, the sealing portion 601 of the cap 600 is separated from the ink outlet 460 side of the tubular portion 420 to form a gap, so that the inside and the outside of the container main body 300 communicate with each other via this gap and the through-hole Ho. As a result, the inside of the ink replenishment container 200 is opened to the atmosphere as indicated by the arrow. Therefore, when an internal pressure of the ink replenishment container 200 is increased by a change in temperature or atmospheric pressure, an internal pressure is released during the opening of the cap from the closed state, so that the ink jet can be prevented. In addition, when the ink is replenished from the ink replenishment container 200 of which the internal pressure is increased to the ink tank 700, it is easy to prevent the ink from being replenished beyond an upper limit of the filling of the ink tank 700. Further, in the state in which the cap 600 is closed, the projection 602 of the cap 600 is inserted into the sealing member through-hole 510*h* in the center portion without contacting the plurality of wing-like portions Fp. Therefore, it is possible to prevent the wing-like portion Fp from being deformed and habituated, so that the original function of the wing-like portion Fp can be easily maintained.

With the first embodiment described above, the sealing member 510 has the six wing-like portions Fp made of an elastic material and separated by the six slit-shaped gaps Ap extending from the center portion in the radial direction when viewed from the ink outlet side in the central axis direction. Therefore, the wing-like portion Fp that tries to be restored from elastic deformation blocks ink from being lifted from the ink inlet flow path member 710 when the ink replenishment container 200 is removed from the ink inlet flow path member 710, so that ink dripping can be reduced. Further, with the capillary action of the slit-shaped gap Ap, it becomes easier to hold the ink and it becomes possible to prevent the ink from dripping.

Further, air rises from one of a plurality of partitioned flow paths of the ink inlet flow path member 710, and enters the container main body 300 through a gap between the tubular portion 420 and the valve housing 517 via the through-hole Ho of the valve housing 517 and a gap between the tubular portion 420 and the valve body 520 and the spring member 530. On the other hand, the ink in the container main body 300 flows into the other one of the plurality of flow paths via the gap and the through-hole Ho. Therefore, the air and the liquid are more appropriately separated and the liquid can be quickly replenished by smooth air-liquid exchange, as compared with a configuration in which a valve body and a spring member are accommodated inside a tubular flow path portion without the through-hole Ho, and the air and liquid pass through the inside of the tubular flow path portion without the through-hole Ho.

In the first embodiment, in the replenishment state, the projection portion 526 of the valve body 520 comes into contact with the partition wall 714 of the ink inlet flow path member 710, so that the cylindrical portion 524 is separated from the sealing member 510, and the gap of the cylindrical portion 524 and the sealing member 510 communicates with the through-hole Ho of the valve housing 517. The replenishment flow paths 411 and 412, which are formed as a gap between the valve housing 517, the valve body 520, the spring member 530, and the inner peripheral surface of the tubular portion 420 in the tubular flow path portion 410 via the through-hole Ho, are configured to communicate with the flow paths 711 and 712 of the ink inlet flow path member 710. In this manner, by providing the projection portion 526 at a tip of the valve body 520 and providing the through-hole Ho in the valve housing 517, in the valve open state in which the projection portion 526 comes into contact with the partition wall 714 of the ink inlet flow path member 710, it is possible to easily realize an inter-flow-path communication state in which the flow paths 711 and 712 communicate with the through-hole Ho through the gap between the sealing member 510 and a tip of the cylindrical portion 524, and further communicate with the replenishment flow paths 411 and 412 formed as the gap between the valve housing 517 and the inner peripheral surface of the tubular portion 420 and the gap between the valve body 520, the spring member 530, and the inner peripheral surface of the tubular portion 420.

In addition, since in the projection portion 526 of the valve body 520, the cross-sectional area on a side in contact with the partition wall 714 is smaller than the cross-sectional area on a rear end side, it is difficult to obstruct the inflow of the ink and the outflow of the air through the plurality of flow paths, and it is possible to smoothly perform the air-liquid exchange. Further, since the rear end side becomes thicker, a strength when the projection portion 526 of the valve body 520 comes into contact with the partition wall 714 can be maintained, and the partition function can be appropriately maintained.

Further, since the gas and the liquid flow along the inclined surface 526B of the projection portion 526, mutual interference is reduced, so the liquid can be quickly replenished by smoothly performing the air-liquid exchange.

Further, since at least the center portion of the valve housing 517 on the rear end side is closed, interference between air and liquid can be prevented, air-liquid exchange can be smoothly performed, and the ink can be quickly replenished.

Further, the valve body 520 has the cylindrical portion 524 facing the inner surface of the valve housing 517. The cylindrical portion 524 is configured to be slidable by being guided by the inner surface of the valve housing 517. Therefore, an opening and closing operation of the valve body 520 is appropriately performed.

In addition, the wing-like portion Fp is formed such that the length La from the base of the wing-like portion Fp to the center portion side tip in the radiation direction is shorter than the length Lc from the base of the wing-like portion Fp of the sealing member 510 to the sealing end Eg in the central axis direction. Therefore, in the valve open state in which the ink inlet flow path member 710 presses the valve body 520 to open, it is easy to prevent the elastically deformed tip of the wing-like portion Fp from obstructing a flow of the ink and gas of the flow paths 711 and 712 of the ink inlet flow path member 710 and the inside of the container main body 300.

In addition, in the valve open state, the tubular portion 420 is formed such that the gap Be into which the wing-like portion Fp enters is provided between the inner surface of the tubular portion 420 and the outer surface of the ink inlet flow path member 710. Therefore, the frictional resistance of inserting and removing the ink inlet flow path member 710 is reduced, and the ink replenishment container 200 can be easily coupled to and uncoupled from the ink inlet flow path member 710.

Further, the base of the wing-like portion Fp contacts and seals an outer peripheral side surface of the ink inlet flow path member 710. Therefore, when ink is replenished, the base of the wing-like portion Fp is likely to receive the ink transmitted along the outer peripheral side surface of the ink inlet flow path member 710, and the ink is less likely to leak.

Further, the length Lb of the slit-shaped gap Ap in the radial direction is formed so as to be shorter than the radius from the axis center of the central axis to the outer circumference of the ink inlet flow path member 710. Therefore, the sealing property between the ink inlet flow path member 710 and the base of the wing-like portion Fp is improved, and the ink is less likely to leak.

Further, the ink replenishment container 200 includes the cap 600 capable of covering the ink outlet, and the cap 600 has the projection 602 that presses the valve body 520 in a state in which the cap 600 is closed to be in the "valve open state". The sealing member 510 has the sealing member through-hole 510*h* at the center portion of the sealing member 510, and the projection 602 is inserted into the sealing member through-hole 510*h* without contacting the plurality of wing-like portions Fp in a state in which the cap 600 is closed. Therefore, when the internal pressure of the ink replenishment container 200 is increased by a change in temperature or atmospheric pressure, the internal pressure is released when the opening of the cap 600 from the closed state, so that the ink jet can be prevented. In addition, when the ink is replenished from the ink replenishment container 200 of which the internal pressure is increased to the ink tank 700, it is easy to prevent the ink from being replenished beyond an upper limit of the filling of the ink tank 700. Further, the projection 602 of the cap 600 is inserted without contacting the plurality of wing-like portions Fp. Therefore, it is possible to prevent the wing-like portion Fp from being deformed and habituated, so that the original function of the wing-like portion Fp can be easily maintained.

Further, the valve housing 517 has the retaining portion 517A of the sealing member 510 on the tip side and the engaging portion 517B with the tubular portion 420, and is detachably configured in the tubular portion 420. As described above, in the outlet valve unit 500, the sealing member 510 is also assembled so as to be held together with the spring valve 535 by the retaining portion 517A, and is integrated. Therefore, since the outlet valve unit 500 is detachable by itself, it is easy to manufacture or handle the outlet valve unit 500, and the outlet valve unit 500 can be transported by itself, and the outlet valve unit 500 can be replaced when the ink replenishment container 200 is reused.

The "partition wall 714" in the first embodiment corresponds to the "partition" of the present disclosure.

B. Other Embodiments

B-1. Other Embodiment 1

In the ink replenishment container 200 according to the first embodiment, the sealing member 510 has the six wing-like portions Fp separated by the six slit-shaped gaps Ap, and the present disclosure is not limited to this. As long as the operation and effect of the present disclosure are achieved, the number of wing-like portions Fp is not limited to six, and may have any number of plurality of wing-like portions Fp separated by any number of plurality of slit-shaped gaps Ap.

B-2. Other Embodiment 2

In the first embodiment described above, the ink replenishment container 200 includes the cap 600, and the cap 600 may not be provided.

B-3. Other Embodiment 3

Figure 16:
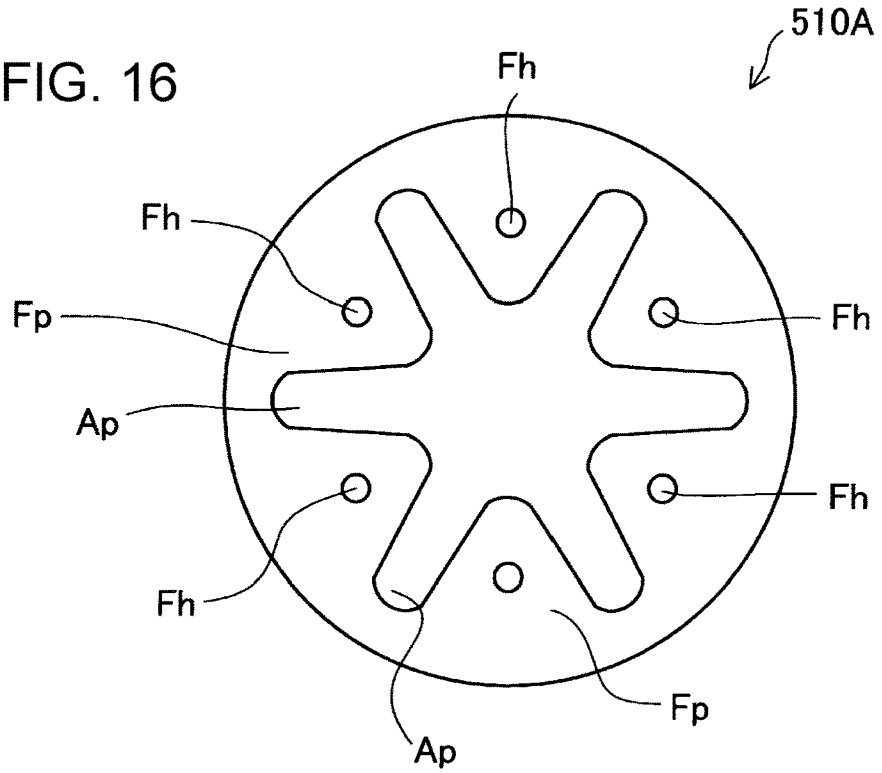
FIG. 16 is a schematic plan view of a wing-like portion of the sealing member on which making holes processing is executed.
Figure 17:
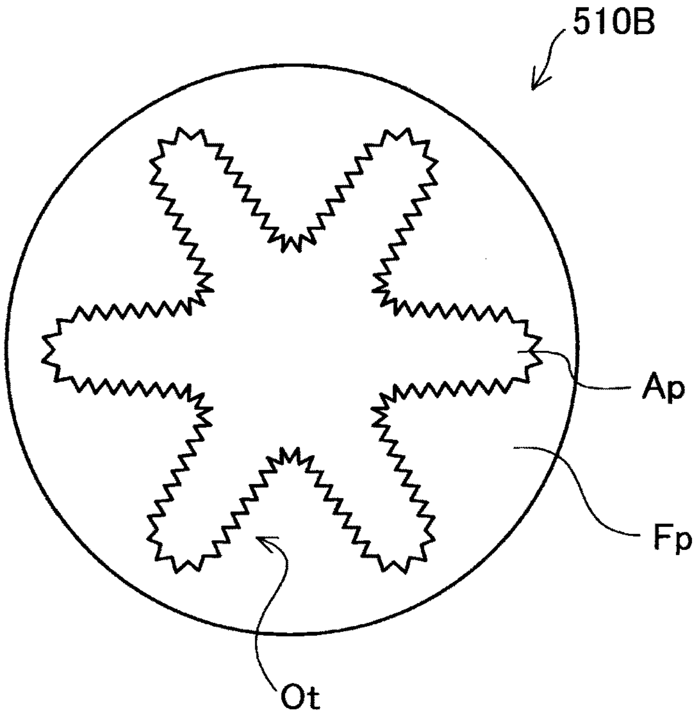
FIG. 17 is a schematic plan view of a wing-like portion of the sealing member on which roughness processing is executed.

In the first embodiment described above, the wing-like portion Fp of the sealing member 510 is not processed so as to promote the capillary action, and the present disclosure is not limited to this. FIG. 16 is a schematic plan view of the wing-like portion Fp of the sealing member 510A on which making holes processing is executed. Further, FIG. 17 is a schematic plan view of the wing-like portion Fp of the sealing member 510B on which roughness processing is executed. As illustrated in FIGS. 16 and 17, ink is easily held by the processing with holes Fh capable of promoting the capillary action or the processing with a roughness Ot. Therefore, it is possible to reduce ink leakage from the ink replenishment container 200 when the ink replenishment container 200 is removed from the ink inlet flow path member 710.

B-4. Other Embodiment 4

Figure 18:
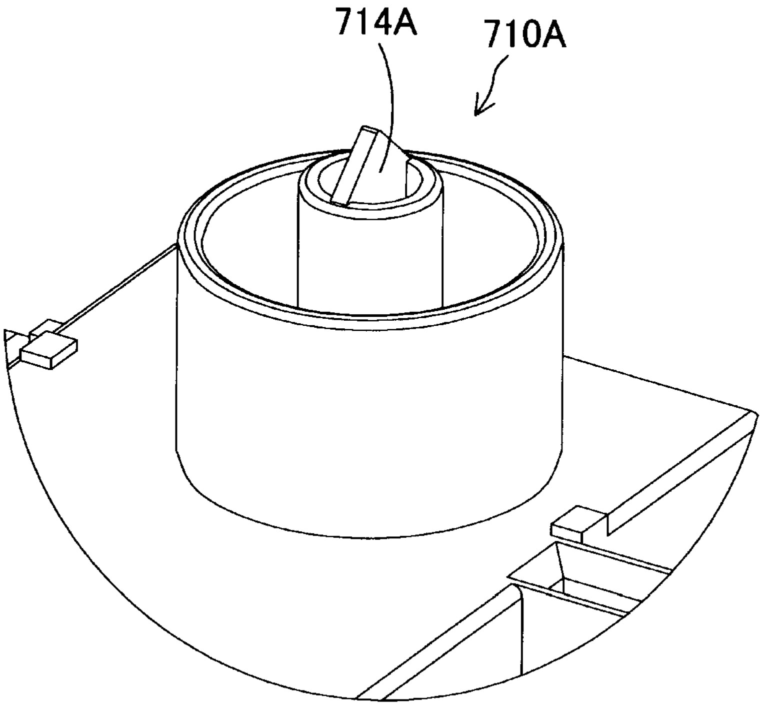
FIG. 18 is a perspective view illustrating the ink inlet flow path member according to another embodiment 4.

In the first embodiment described above, as illustrated in FIG. 9, the part of the tip surface of the ink inlet flow path member 710 corresponds to the end portion of the partition wall 714, and the partition wall 714 does not project from the ink inlet flow path member 710 in the axial direction, and the present disclosure is not limited to this. FIG. 18 is a perspective view illustrating the ink inlet flow path member 710A according to the other embodiment 4. As illustrated in FIG. 18, the partition wall 714A may project from the ink inlet flow path member 710A in the axial direction.

B-5. Other Embodiment 5

Figure 19:
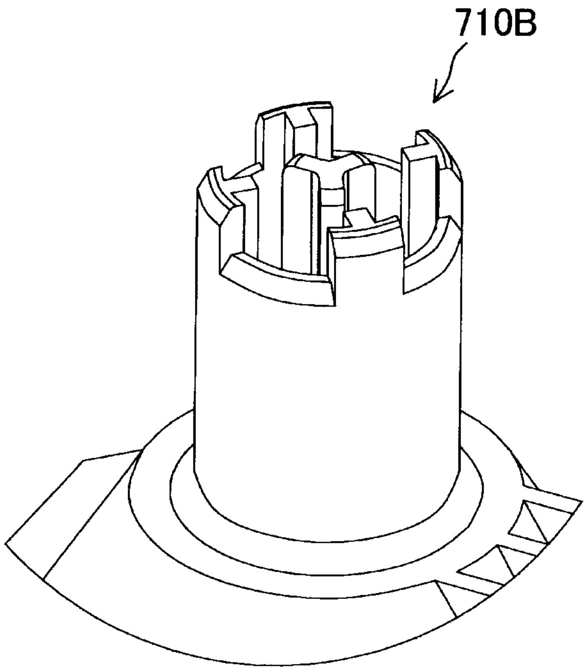
FIG. 19 is a perspective view illustrating a first ink inlet flow path member having a step at a tip.
Figure 20:
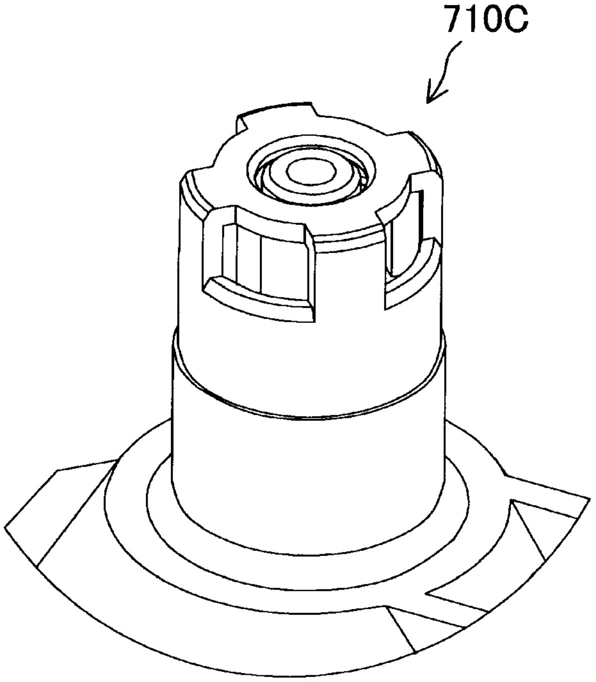
FIG. 20 is a perspective view illustrating a second ink inlet flow path member having a step at a tip.

In the first embodiment described above, the ink inlet flow path member 710 has the cylindrical peripheral wall and the end surface in the axial direction is flat, and the present disclosure is not limited to this. FIG. 19 is a perspective view illustrating a first ink inlet flow path member 710B having a step at a tip. FIG. 20 is a perspective view illustrating a second ink inlet flow path member 710C having a step at a tip. As illustrated in FIGS. 19 and 20, the first ink inlet flow path member 710B and the second ink inlet flow path member 701C may have a cylindrical peripheral wall, and have a recess step in the axial direction at the tip on the ink inlet side of the peripheral wall, and the sealing member 510 may be formed such that a width of the base of the wing-like portion Fp is larger than a width of the step. Therefore, the wing-like portion Fp is less likely to fit into the step, and thus the flow of liquid or gas is less likely to be obstructed. Further, since it is easy to prevent the part of the wing-like portion Fp from being fitted into the step, it is easy to restore the plurality of wing-like portions Fp at the same time, and it is easy to exert the effect of preventing ink leakage.

B-6. Other Embodiment 6

In the first embodiment described above, the ink inlet flow path member 710 has the cylindrical peripheral wall and the end surface in the axial direction is flat, and the present disclosure is not limited to this. As illustrated in FIGS. 19 and 20, the first ink inlet flow path member 710B and the second ink inlet flow path member 701C may have the cylindrical peripheral wall, and have the recess step in the axial direction at the tip on the ink inlet side of the peripheral wall, and the sealing member 510 may be formed such that the width of the base of the wing-like portion Fp is smaller than the width of the step. Therefore, the wing-like portion Fp is fitted into the step, so that the flow of liquid or gas is unlikely to be obstructed. Further, as compared with when the wing-like portion Fp is restored from the state of being sandwiched between the peripheral wall of the ink inlet flow path member 710 and the tubular portion 420 of the ink replenishment container 200, the wing-like portion Fp is restored from a position of the step, so that the wing-like portion Fp can be easily restored more quickly and the function of preventing ink leakage can be quickly exerted.

B-7. Other Embodiment 7

Figure 21:
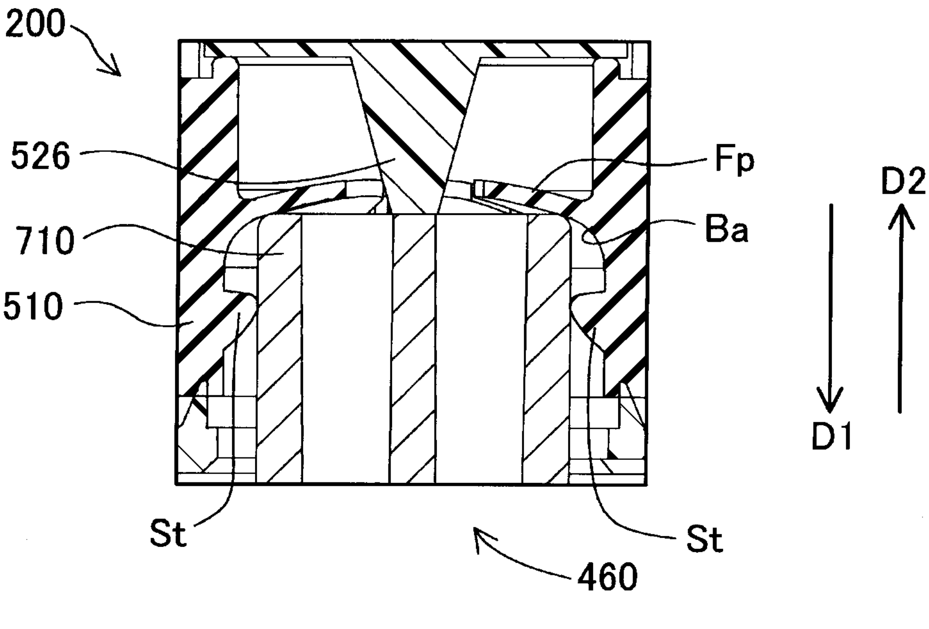
FIG. 21 is a cross-sectional view describing a projecting sealing portion.

In the first embodiment described above, the sealing member 510 does not have a projecting sealing portion located between the base Ba of the wing-like portion Fp and a tip of the ink outlet 460 in the central axis direction, and the present disclosure is not limited thereto. FIG. 21 is a cross-sectional view describing a projecting sealing portion St. In FIG. 21, for convenience of illustration, only a part of each of the ink replenishment container 200 and the ink tank 700 is enlarged and illustrated. As illustrated in FIG. 21, the sealing member 510 may have the projecting sealing portion St that contacts and seals the outer peripheral side surface of the ink inlet flow path member 710, and the projecting sealing portion St may be located between the base Ba of the wing-like portion Fp and the tip of the ink outlet 460 in the central axis direction. With this aspect, the projecting sealing portion St is unlikely to affect the restoration of the wing-like portion Fp, so that the wing-like portion Fp can be easily restored and the function of blocking ink can be appropriately maintained.

B-8. Other Embodiment 8

Figure 22:
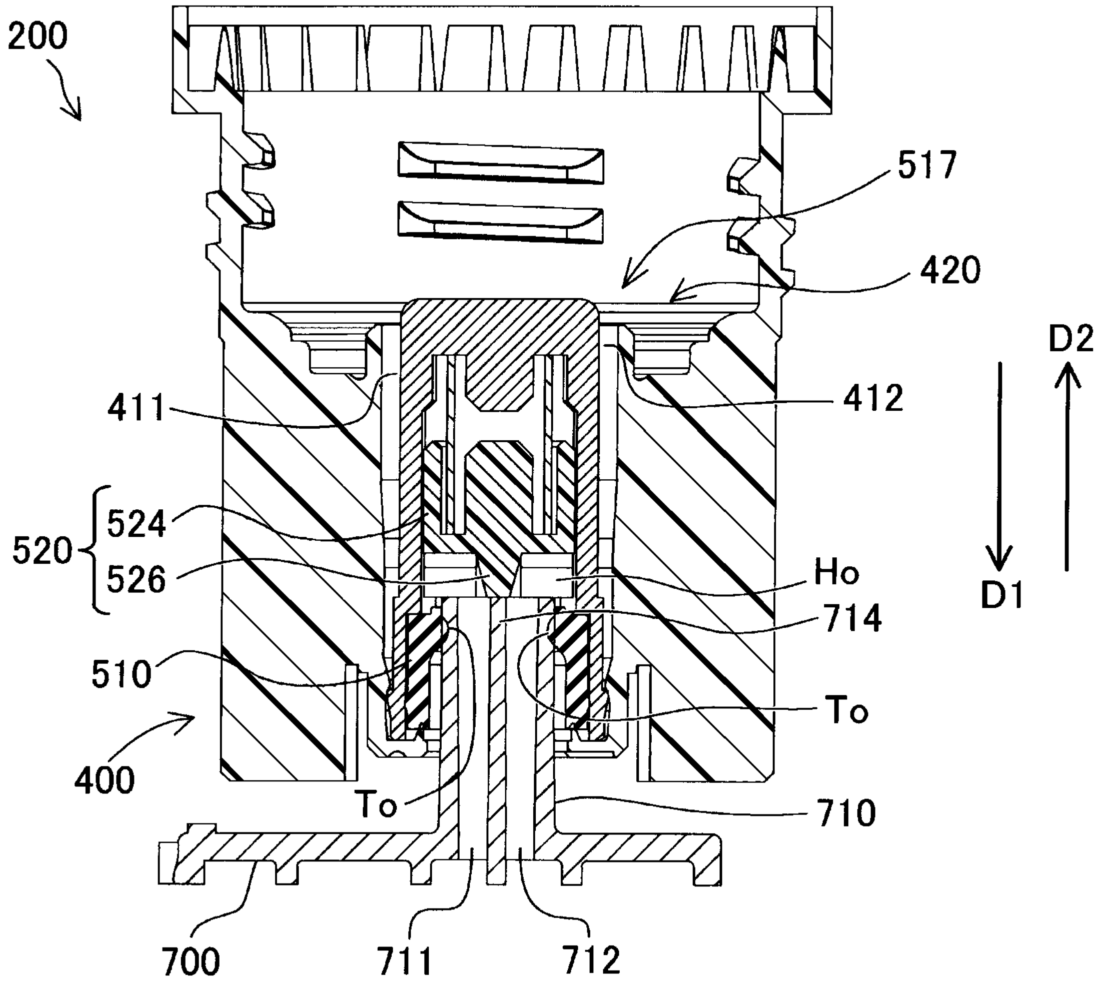
FIG. 22 is a cross-sectional view describing a position of the projecting sealing portion in a valve open state.
Figure 23:
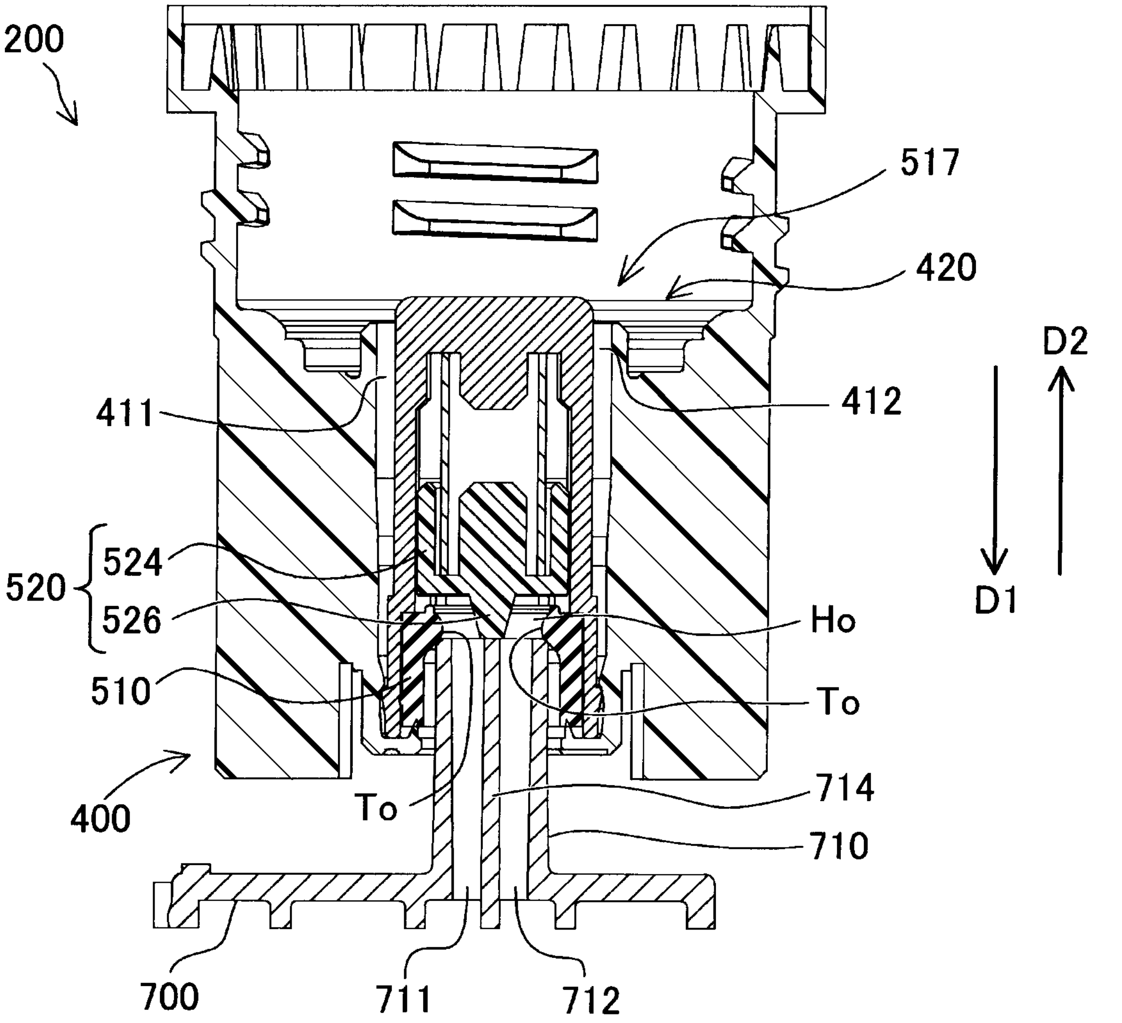
FIG. 23 is a cross-sectional view illustrating a state in which the ink inlet flow path member is moved from the state in FIG. 22 toward a tip side direction.
Figure 24:
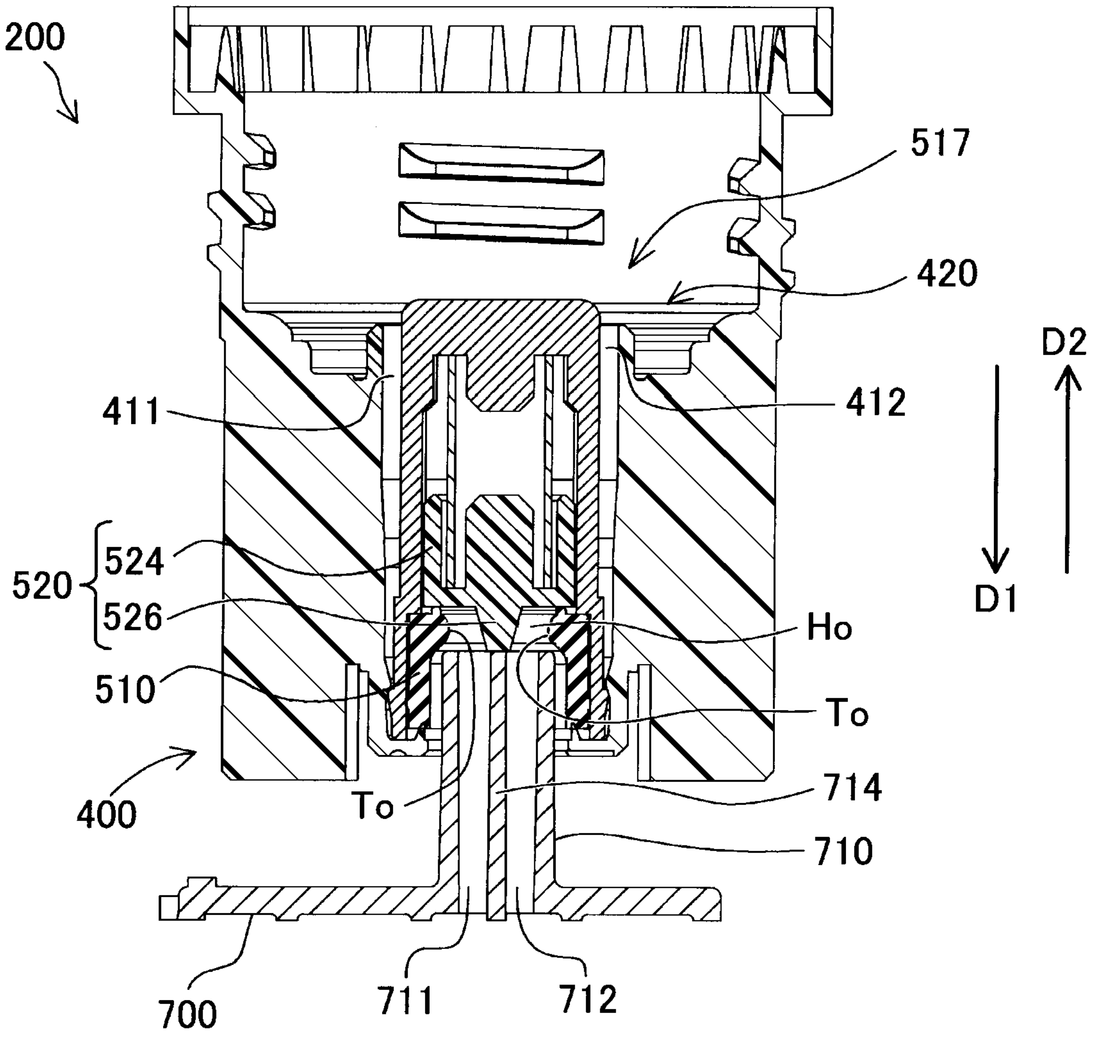
FIG. 24 is a cross-sectional view illustrating a state in which contact between the ink inlet flow path member and the sealing member is released.
Figure 25:
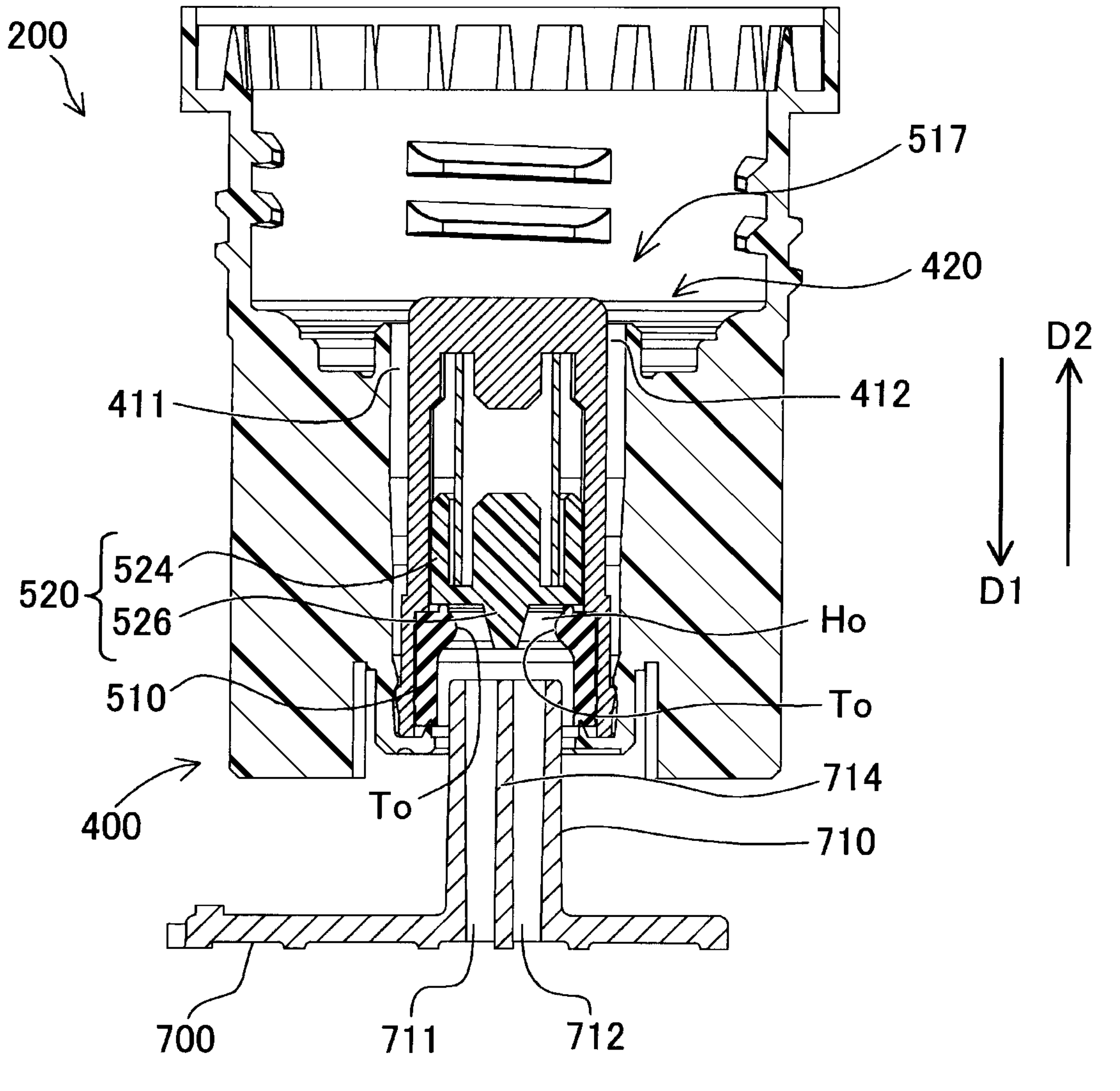
FIG. 25 is a cross-sectional view illustrating a state in which contact between the ink inlet flow path member and the projection portion is released.

FIGS. 22 to 25 are cross-sectional views describing a flow until the valve open state is shifted to the valve close state and the ink inlet flow path member 710 is separated from the projection portion 526. As illustrated in FIGS. 22 to 25, the sealing member 510 has a projecting sealing portion To. The projecting sealing portion To plays a role of contacting and sealing the outer peripheral side surface of the ink inlet flow path member 710. FIG. 22 is a cross-sectional view describing a position of the projecting sealing portion To in the valve open state. FIG. 23 is a cross-sectional view illustrating a state in which the ink inlet flow path member 710 is moved from the state in FIG. 22 to the tip side direction D1. FIG. 24 is a cross-sectional view illustrating a state in which contact between the ink inlet flow path member 710 and the sealing member 510 is released. FIG. 25 is a cross-sectional view illustrating a state in which contact between the ink inlet flow path member 710 and the projection portion 526 is released. In addition, in FIGS. 22 to 25, only a part of each of the ink replenishment container 200 and the ink tank 700 is illustrated. According to the other embodiment 8, there is provided the ink replenishment container 200 that communicates with the ink tank 700 of the printer 100 to replenish ink into the ink tank 700 via the ink inlet flow path member 710 having ink inlet flow paths, which are a plurality of flow paths 711 and 712 partitioned by the partition wall 714, the ink replenishment container 200 may include: the container main body 300 (not illustrated in FIGS. 22 to 25) configured to accommodate the ink; the ink outlet forming portion 400 coupled to the container main body 300 and including the tubular portion 420 having an ink outlet; the spring valve that includes the valve body 520 mounted in the tubular portion 420 and a spring which urges the valve body 520 toward the ink outlet in a direction of a central axis of the ink outlet, and has the valve open state when the valve body 520 is pressed by the ink inlet flow path member 710 in a direction opposite to the urging direction and has the valve close state when the ink inlet flow path member 710 is removed from the ink outlet; and the sealing member 510 that is mounted in the tubular portion 420 and that comes into contact with and seals the valve body 520 in the valve close state, in which the sealing member 510 may have the projecting sealing portion To that comes into contact with and seals the outer peripheral side surface of the ink inlet flow path member 710 in the valve open state, and when the valve open state is shifted to the valve close state, the sealing between the projecting sealing portion To and the ink inlet flow path member 710 may be released, and then the contact between the valve body 520 and the ink inlet flow path member 710 may be released.

As illustrated in FIG. 22, the projecting sealing portion To is in contact with the outer peripheral side surface of the ink inlet flow path member 710 in the valve open state. As illustrated in FIG. 23, the projecting sealing portion To is in contact with an end portion of the ink inlet flow path member 710 in the rear end side direction. As illustrated in FIG. 24, the contact between the projecting sealing portion To and the ink inlet flow path member 710 is released. As illustrated in FIG. 25, the contact between the projection portion 526 of the valve body 520 and the ink inlet flow path member 710 is released. As illustrated in FIGS. 22 to 25, the sealing between the sealing member 510 and the ink inlet flow path member 710 is released first, and it becomes easier to draw in air. Therefore, ink adhering to the ink inlet flow path member 710 is drawn into the flow path of the ink inlet flow path member 710 and it is possible to prevent the ink from dripping when the ink replenishment container 200 is removed from the ink inlet flow path member 710.

B-9. Other Embodiment 9

Figure 26:
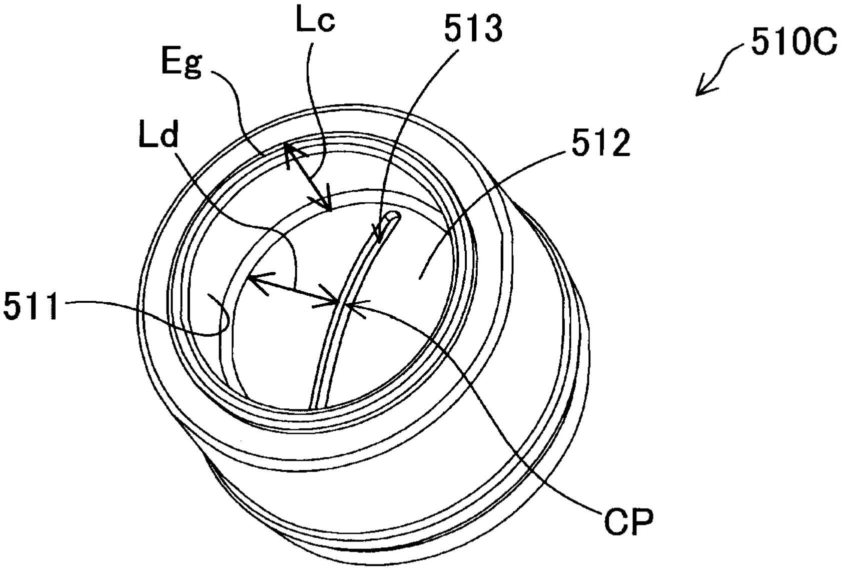
FIG. 26 is a perspective view illustrating a sealing member according to another embodiment 9.

In the first embodiment and other embodiments 1 to 8, the sealing members 510, 510A, and 510B have any number of plurality of wing-like portions Fp, and the present disclosure is not limited to this. FIG. 26 is a perspective view illustrating a sealing member 510C according to the other embodiment 9. The sealing member 510C has a tubular appearance shape, and includes an inner peripheral wall 511 and an elastic membrane portion 512, in the same manner as the sealing member 510 according to the first embodiment or the sealing members 510A and 510B according to the other embodiment 3. The inner peripheral wall 511 has a cylindrical appearance shape centered on a central axis of the ink outlet 460. The elastic membrane portion 512 is configured to extend from the inner peripheral wall 511 toward a center CP. The elastic membrane portion 512 is formed with a single slit-shaped gap 513 passing through a center portion including the center CP. The gap 513 has a straight-line appearance shape in a plan view. The gap 513 may have a curved appearance shape instead of the straight-line shape in a plan view. This gap 513 corresponds to the sealing member through-hole 510*h* of the first embodiment. Further, the elastic membrane portion 512 corresponds to the wing-like portion Fp in the sealing member 510 of the first embodiment or the sealing members 510A and 510B of the other embodiment 3.

The sealing member 510C and the tubular portion 420 have the following features (i) to (iv). These features are also common to the first embodiment described above and each of the other embodiments 1 to 8.

(i) The sealing member 510C is configured such that a length Ld from a base of the elastic membrane portion 512 on an inner peripheral wall 511 side to a center portion of the slit-shaped gap 513 in the radial direction is shorter than the length Lc from the base of the elastic membrane portion 512 to the sealing end Eg in the central axis direction of the ink outlet 460. The "radial direction" corresponds to the "radiation direction" described above.

(ii) In a valve close state, the elastic membrane portion 512 is formed such that a center portion side is located on the container main body 300 side than the base on the inner peripheral wall 511 side, and a cross-sectional shape is an arcuate shape, in the central axis direction of the ink outlet 460.

(iii) In a valve open state, the tubular portion 420 is configured such that a gap into which the elastic membrane portion 512 enters is provided between the inner surface of the tubular portion 420 and the outer surface of the ink inlet flow path member 710.

(iv) In the valve open state, the base of the elastic membrane portion 512 on the inner peripheral wall 511 side contacts and seals the outer peripheral side surface of the ink inlet flow path member 710.

(v) The sealing member 510C is configured such that a length from the center portion to the end of the slit-shaped gap 513 in the radial direction is shorter than a radius from the axis center of the central axis to the outer circumference of the ink inlet flow path member 710, in the same manner as the relationship between the length Lb and the radius from the axis center of the central axis to the outer circumference of the ink inlet flow path member 710 illustrated in FIG. 6.

Further, in the configuration using the sealing member 510C, the sealing member 510C may have the projecting sealing portion St illustrated in FIG. 21, in the same manner as in the other embodiment 7 described above. In such a configuration, the projecting sealing portion St may be located between the base of the elastic membrane portion 512 on the inner peripheral wall 511 side and the tip of the ink outlet 460 in the central axis direction of the ink outlet 460. Further, in the configuration using the sealing member 510C, roughness processing or making holes processing capable of promoting the capillary action may be executed on the elastic membrane portion 512, in the same manner as the other embodiment 3 described above.

C. Other Aspects

The present disclosure is not limited to the embodiments described above, and can be realized in various configurations without departing from the spirit thereof. For example, the technical features in the embodiments corresponding to technical features in each aspect to be described below can be replaced or combined as appropriate to solve some or all of the problems described above, or to achieve some or all of the effects described above. Further, when the technical feature is not described as essential in the present specification, the technical feature can be appropriately deleted.

(1) According to a first aspect of the present disclosure, there is provided an ink replenishment container for replenishing ink into an ink tank of a printer via an ink inlet flow path member of the ink tank, the ink inlet flow path member having a plurality of flow paths partitioned by a partition. The ink replenishment container includes: a container main body configured to accommodate the ink; an ink outlet forming portion coupled to the container main body and including a tubular portion having an ink outlet; a spring valve that includes a valve body mounted in the tubular portion and a spring which urges the valve body toward the ink outlet in a direction of a central axis of the ink outlet, and has a valve open state in which the valve body is pressed by the ink inlet flow path member in a direction opposite to the urging direction and has a valve close state in which the ink inlet flow path member is removed from the ink outlet; and a sealing member mounted in the tubular portion and having a sealing end configured to contact with the valve body in the valve close state, in which the sealing member has a cylindrical inner peripheral wall centered on the central axis and an elastic membrane portion extending from the inner peripheral wall toward the center, and the elastic membrane portion is formed with a slit-shaped gap passing through a center portion including the center. With this aspect, when the ink replenishment container is removed from the ink inlet flow path member, linking of the ink between the ink outlet and the ink inlet flow path member is blocked by the elastic membrane portion during being restored from elastic deformation, so that ink dripping can be reduced. Further, with the capillary action of the slit-shaped gap, it becomes easier to hold the ink and it becomes possible to prevent the ink from dripping.

(2) In the first aspect, the sealing member may be formed such that a length from a base of the elastic membrane portion on an inner peripheral wall side to the center portion of the slit-shaped gap in a radial direction is shorter than a length from the base of the elastic membrane portion to the sealing end in the direction of the central axis. With this aspect, in the valve open state in which the ink inlet flow path member presses the valve body to open, it is easy to prevent the tip of the elastically deformed elastic membrane portion from obstructing the flow of ink and gas between the flow path of the ink inlet flow path member and the inside of the container main body.

(3) In the first aspect, in the valve close state, the elastic membrane portion may be formed such that a center portion side is located on a container main body side in the direction of the central axis from a base on the inner peripheral wall side, and a cross-sectional shape is an arcuate shape. With this aspect, the elastic membrane portion is less likely to be deformed, so that the restoring force is less likely to decrease. Therefore, the elastic membrane portion easily blocks the linking of the ink, and the dripping of the ink can be suppressed. Further, the slit-shaped gap is appropriately maintained, and the ink holding force can be appropriately kept.

(4) In the first aspect, in the valve open state, the tubular portion may be formed such that a gap into which the elastic membrane portion enters is provided between an inner surface of the tubular portion and an outer surface of the ink inlet flow path member. With this aspect, the frictional resistance of inserting and removing the ink inlet flow path member is reduced, and the ink replenishment container can be easily coupled to and uncoupled from the ink inlet flow path member.

(5) In the first aspect, in the valve open state, a base of the elastic membrane portion on an inner peripheral wall side may contact and seal an outer peripheral side surface of the ink inlet flow path member. With this aspect, when ink is replenished, the base of the elastic membrane portion is likely to receive the ink transmitted along the outer peripheral side surface of the ink inlet flow path member, and the ink is less likely to leak.

(6) In the first aspect, the sealing member may be formed such that a length from the center portion to an end of the slit-shaped gap in a radial direction is shorter than a radius from a central axis to an outer circumference of the ink inlet flow path member. With this aspect, the sealing property between the ink inlet flow path member and the base of the elastic membrane portion is improved, and the ink is less likely to leak.

(7) In the first aspect, the sealing member may have a projecting sealing portion that is configured to contact and seal an outer peripheral side surface of the ink inlet flow path member, and the projecting sealing portion may be located between a base of the elastic membrane portion on an inner peripheral wall side and a tip of the ink outlet in the direction of the central axis. With this aspect, the projecting sealing portion is unlikely to affect the restoration of the elastic membrane portion, so that the elastic membrane portion can be easily restored and the function of blocking ink can be appropriately maintained.

(8) In the first aspect, roughness processing or making holes processing capable of promoting a capillary action may be executed on the elastic membrane portion. With this aspect, the ink is easily held, and it is possible to reduce the ink leakage when the ink replenishment container is removed.

(9) According to a second aspect of the present disclosure, there is provided an ink replenishment container for replenishing ink into an ink tank of a printer via an ink inlet flow path member of the ink tank, the ink inlet flow path member having a plurality of flow paths partitioned by a partition. The ink replenishment container includes: a container main body configured to accommodate the ink; an ink outlet forming portion coupled to the container main body and including a tubular portion having an ink outlet; a spring valve that includes a valve body mounted in the tubular portion and a spring which urges the valve body toward the ink outlet in a direction of a central axis of the ink outlet, and has a valve open state in which the valve body is pressed by the ink inlet flow path member in a direction opposite to the urging direction and has a valve close state in which the ink inlet flow path member is removed from the ink outlet; and a sealing member mounted in the tubular portion and having a sealing end configured to contact with the valve body in the valve close state, in which the sealing member has a plurality of wing-like portions made of an elastic material and separated by a plurality of slit-shaped gaps extending from a center portion in a radial direction when viewed from an ink outlet side in the direction of the central axis. With this aspect, when the ink replenishment container is removed from the ink inlet flow path member, linking of the ink between the ink outlet and the ink inlet flow path member is blocked by the wing-like portion during being restored from elastic deformation, so that ink dripping can be reduced. Further, with the capillary action of the slit-shaped gap, it becomes easier to hold the ink and it becomes possible to prevent the ink from dripping.

(10) In the second aspect, the wing-like portion may be formed such that a length from a base to a center portion side tip of the wing-like portion in the radial direction is shorter than a length from the base of the wing-like portion to the sealing end of the sealing member in the direction of the central axis. With this aspect, in the valve open state in which the ink inlet flow path member presses the valve body to open, it is easy to prevent the tip of the elastically deformed wing-like portion from obstructing the flow of ink and gas between the flow path of the ink inlet flow path member and the inside of the container main body.

(11) In the second aspect, in the valve close state, the wing-like portion may be formed such that a center portion side tip is located on a container main body side in the direction of the central axis from a base of the wing-like portion and a cross-sectional shape is an arcuate shape. With this aspect, the wing-like portion is less likely to be deformed, so that the restoring force is less likely to decrease. Therefore, the wing-like portion easily blocks the linking of the ink, and the dripping of the ink can be suppressed. Further, the slit-shaped gap is appropriately maintained, and the ink holding force can be appropriately kept.

(12) In the second aspect, in the valve open state, the tubular portion may be formed such that a gap into which the wing-like portion enters is provided between an inner surface of the tubular portion and an outer surface of the ink inlet flow path member. With this aspect, the frictional resistance of inserting and removing the ink inlet flow path member is reduced, and the ink replenishment container can be easily coupled to and uncoupled from the ink inlet flow path member.

(13) In the second aspect, in the valve open state, a base of the wing-like portion may contact and seal an outer peripheral side surface of the ink inlet flow path member. With this aspect, when ink is replenished, the base of the wing-like portion is likely to receive the ink transmitted along the outer peripheral side surface of the ink inlet flow path member, and the ink is less likely to leak.

(14) In the second aspect, the sealing member may be formed such that a length from the center portion to an end of the slit-shaped gap in the radial direction is shorter than a radius from a central axis to an outer circumference of the ink inlet flow path member. With this aspect, the sealing property between the ink inlet flow path member and the base of the wing-like portion is improved, and the ink is less likely to leak.

(15) In the second aspect, the sealing member may have a projecting sealing portion that is configured to contact and seal an outer peripheral side surface of the ink inlet flow path member, and the projecting sealing portion may be located between a base of the wing-like portion and a tip of the ink outlet in the direction of the central axis. With this aspect, the projecting sealing portion is unlikely to affect the restoration of the wing-like portion, so that the wing-like portion can be easily restored and the function of blocking ink can be appropriately maintained.

(16) In the second aspect, roughness processing or making holes processing capable of promoting a capillary action may be executed on the wing-like portion. With this aspect, the ink is easily held, and it is possible to reduce the ink leakage when the ink replenishment container is removed.

(17) The second aspect may further include: a cap configured to cover the ink outlet, in which the cap may have a projection configured to press the valve body in a state in which the cap is closed to obtain the valve open state, and the sealing member may have a through-hole in the center portion, and the projection may be inserted in the through-hole in the state in which the cap is closed. With this aspect, when an internal pressure of the ink replenishment container is increased by a change in temperature or atmospheric pressure, the internal pressure is released when the opening of the cap from the closed state, so that the ink jet can be prevented. In addition, when the ink is replenished from the ink replenishment container of which the internal pressure is increased to the ink tank, it is easy to prevent the ink from being replenished the ink beyond an upper limit of the filling of the ink tank. Further, since the through-hole is provided in the center portion, the projection of the cap is easily inserted into the through-hole without contacting the plurality of wing-like portions, and the wing-like portion is prevented from being deformed and habituated, it is easy to maintain the original function of the wing-like portion.

(18) In the second aspect, the ink inlet flow path member may have a cylindrical peripheral wall, and have a recess step in an axial direction at a tip of the peripheral wall on the ink inlet side, and the sealing member may be formed such that a width of a base of the wing-like portion is larger than a width of the step. With this aspect, the wing-like portion is less likely to fit into the step, and thus the flow of liquid or gas is less likely to be obstructed. Further, since it is easy to prevent the part of the wing-like portion from being fitted into the step, it is easy to restore the plurality of wing-like portions at the same time, and it is easy to exert the effect of preventing ink leakage.

(19) In the second aspect, the ink inlet flow path member may have a cylindrical peripheral wall, and have a recess step in an axial direction at a tip of the peripheral wall on the ink inlet side, and the sealing member may be formed such that a width of a base of the wing-like portion is smaller than a width of the step. With this aspect, a wing is fitted into the step, so that the flow of liquid or gas is unlikely to be obstructed. Further, as compared with when the wing is restored from the state of being sandwiched between the peripheral wall of the ink inlet flow path member and the tubular portion of the ink replenishment container, the wing-like portion Fp is restored from a position of the step, so that the wing-like portion Fp can be easily restored more quickly and the function of preventing ink leakage can be quickly exerted.

(20) According to a third aspect of the present disclosure, there is provided an ink replenishment container for replenishing ink into an ink tank of a printer via an ink inlet flow path member of the ink tank, the ink inlet flow path member having a plurality of flow paths partitioned by a partition. The ink replenishment container may include: a container main body configured to accommodate the ink; an ink outlet forming portion coupled to the container main body and including a tubular portion having an ink outlet; a spring valve that includes a valve body mounted in the tubular portion and a spring which urges the valve body toward the ink outlet in a direction of a central axis of the ink outlet, and has a valve open state in which the valve body is pressed by the ink inlet flow path member in a direction opposite to the urging direction and has a valve close state in which the ink inlet flow path member is removed from the ink outlet; and a sealing member that is mounted in the tubular portion and that is configured to contact and seal the valve body in the valve close state, in which the sealing member may have a projecting sealing portion configured to contact and seal an outer peripheral side surface of the ink inlet flow path member in the valve open state, and when the valve open state is shifted to the valve close state, the sealing between the projecting sealing portion and the ink inlet flow path member may be released, and then the contact between the valve body and the ink inlet flow path member may be released. With this aspect, the sealing between the sealing member and the ink inlet flow path member is released first, and it becomes easier to draw in air. Therefore, ink adhering to the ink inlet flow path member is drawn into the flow path of the ink inlet flow path member, and it is possible to prevent the ink from dripping when the ink replenishment container is removed from the ink inlet flow path member.

The present disclosure can be realized in aspects such as a method of manufacturing an ink replenishment container in addition to the aspects described above.

What is claimed is:

1. An ink replenishment container for replenishing ink into an ink tank of a printer via an ink inlet flow path member of the ink tank, the ink inlet flow path member having a plurality of flow paths partitioned by a partition, the ink replenishment container comprising:

a container main body configured to accommodate the ink;

an ink outlet forming portion coupled to the container main body and including a tubular portion having an ink outlet;

a spring valve that includes a valve body mounted in the tubular portion and a spring which urges the valve body toward the ink outlet in an urging direction along a direction of a central axis of the ink outlet, and has a valve open state in which the valve body is pressed by the ink inlet flow path member in a direction opposite to the urging direction and has a valve close state in which the ink inlet flow path member is removed from the ink outlet; and a sealing member mounted in the tubular portion and having a sealing end configured to contact with the valve body in the valve close state, wherein the sealing member has a cylindrical inner peripheral wall centered on the central axis and an elastic membrane portion extending from the inner peripheral wall toward a center of the sealing member, and the elastic membrane portion is formed with a slit-shaped gap passing through a center portion including the center, and the slit-shaped gap has a shape of a single line.

2. The ink replenishment container according to claim 1, wherein a length from a base of the elastic membrane portion on an inner peripheral wall side to the center portion of the slit-shaped gap in a radial direction is shorter than a length from the base of the elastic membrane portion to the sealing end in the direction of the central axis.

3. The ink replenishment container according to claim 1, wherein in the valve close state, the elastic membrane portion is formed such that a center portion side is located on a container main body side in the direction of the central axis from a base on the inner peripheral wall side, and a cross-sectional shape is an arcuate shape.

4. The ink replenishment container according to claim 1, wherein in the valve open state, a gap into which the elastic membrane portion enters is provided between an inner surface of the tubular portion and an outer surface of the ink inlet flow path member.

5. The ink replenishment container according to claim 1, wherein in the valve open state, a base of the elastic membrane portion on an inner peripheral wall side contacts and seals an outer peripheral side surface of the ink inlet flow path member.

6. The ink replenishment container according to claim 1, wherein a length from the center portion to an end of the slit-shaped gap in a radial direction is shorter than a radius from a central axis to an outer circumference of the ink inlet flow path member.

7. The ink replenishment container according to claim 1, wherein the sealing member has a projecting sealing portion that is configured to contact and seal an outer peripheral side surface of the ink inlet flow path member, and the projecting sealing portion is located between a base of the elastic membrane portion on an inner peripheral wall side and a tip of the ink outlet in the direction of the central axis.

8. The ink replenishment container according to claim 1, wherein roughness processing or making holes processing configured to promote a capillary action is executed on the elastic membrane portion.

9. An ink replenishment container for replenishing ink into an ink tank of a printer via an ink inlet flow path member of the ink tank, the ink inlet flow path member having a plurality of flow paths partitioned by a partition, the ink replenishment container comprising:

a container main body configured to accommodate the ink;

an ink outlet forming portion coupled to the container main body and including a tubular portion having an ink outlet;

a spring valve that includes a valve body mounted in the tubular portion and a spring which urges the valve body toward the ink outlet in an urging direction along a direction of a central axis of the ink outlet, and has a valve open state in which the valve body is pressed by the ink inlet flow path member in a direction opposite to the urging direction and has a valve close state in which the ink inlet flow path member is removed from the ink outlet; and a sealing member mounted in the tubular portion and having a sealing end configured to contact with the valve body in the valve close state, wherein the sealing member has a plurality of wing-like portions made of an elastic material and separated by a plurality of slit-shaped gaps extending from a center portion in a radial direction when viewed from an ink outlet side in the direction of the central axis, and the plurality of wing-like portions surrounds a through hole passing the central axis, each of the plurality of wing-like portions having a curved tip facing the though hole.

10. The ink replenishment container according to claim 9, wherein the wing-like portion is formed such that a length from a base to a center portion side tip of the wing-like portion in the radial direction is shorter than a length from the base of the wing-like portion to the sealing end of the sealing member in the direction of the central axis.

11. The ink replenishment container according to claim 9, wherein in the valve close state, the wing-like portion is formed such that a center portion side tip is located on a container main body side in the direction of the central axis from a base of the wing-like portion and a cross-sectional shape is an arcuate shape.

12. The ink replenishment container according to claim 9, wherein in the valve open state, a gap into which the wing-like portion enters is provided between an inner surface of the tubular portion and an outer surface of the ink inlet flow path member.

13. The ink replenishment container according to claim 9, wherein in the valve open state, a base of the wing-like portion contacts and seals an outer peripheral side surface of the ink inlet flow path member.

14. The ink replenishment container according to claim 9, wherein a length from the center portion to an end of the slit-shaped gap in the radial direction is shorter than a radius from a central axis to an outer circumference of the ink inlet flow path member.

15. The ink replenishment container according to claim 9, wherein the sealing member has a projecting sealing portion that is configured to contact and seal an outer peripheral side surface of the ink inlet flow path member, and the projecting sealing portion is located between a base of the wing-like portion and a tip of the ink outlet in the direction of the central axis.

16. The ink replenishment container according to claim 9, wherein roughness processing or making holes processing configured to promote a capillary action is executed on the wing-like portion.

17. The ink replenishment container according to claim 9, further comprising:

a cap configured to cover the ink outlet, wherein the cap has a projection configured to press the valve body in a state in which the cap is closed to obtain the valve open state, and the sealing member has a through-hole in the center portion, and the projection is inserted in the through-hole in the state in which the cap is closed.

18. The ink replenishment container according to claim 9, wherein the ink inlet flow path member has a cylindrical peripheral wall, and has a recess step in an axial direction at a tip of the peripheral wall on the ink inlet side, and the sealing member is formed such that a width of a base of the wing-like portion is larger than a width of the step.

19. The ink replenishment container according to claim 9, wherein the ink inlet flow path member has a cylindrical peripheral wall, and has a recess step in an axial direction at a tip of the peripheral wall on the ink inlet side, and the sealing member is formed such that a width of a base of the wing-like portion is smaller than a width of the step.

20. An ink replenishment container for replenishing ink into an ink tank of a printer via an ink inlet flow path member of the ink tank, the ink inlet flow path member having a plurality of flow paths partitioned by a partition, the ink replenishment container comprising:

a container main body configured to accommodate the ink;

an ink outlet forming portion coupled to the container main body and including a tubular portion having an ink outlet;

a spring valve that includes a valve body mounted in the tubular portion and a spring which urges the valve body toward the ink outlet in an urging direction along a direction of a central axis of the ink outlet, and has a valve open state in which the valve body is pressed by the ink inlet flow path member in a direction opposite to the urging direction and has a valve close state in which the ink inlet flow path member is removed from the ink outlet; and a sealing member that is mounted in the tubular portion and that is configured to contact and seal the valve body in the valve close state, wherein the sealing member has a plurality of wing-like portions made of an elastic material and separated by a plurality of slit-shaped gaps extending from a center portion in a radial direction when viewed from an ink outlet side in the direction of the central axis, and a projecting sealing portion configured to contact and seal an outer peripheral side surface of the ink inlet flow path member in the valve open state, and when the valve open state is shifted to the valve close state, the sealing between the projecting sealing portion and the ink inlet flow path member is released, and then the contact member between the valve body and the ink inlet flow path member is released, and wherein the projecting sealing portion and plurality of wing-like portions are arranged at different locations in the direction of the central axis.

* * * * *